(12) United States Patent
Ishikawa et al.

(10) Patent No.: US 10,762,648 B2
(45) Date of Patent: Sep. 1, 2020

(54) IMAGE PROCESSING APPARATUS, IMAGE PROCESSING METHOD, IMAGE PROCESSING SYSTEM, AND PROGRAM

(71) Applicant: CANON KABUSHIKI KAISHA, Tokyo (JP)

(72) Inventors: Ryo Ishikawa, Kawasaki (JP); Takaaki Endo, Urayasu (JP); Kazuhiro Miyasa, Narashino (JP); Kenji Morita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 97 days.

(21) Appl. No.: 16/073,156

(22) PCT Filed: Dec. 28, 2016

(86) PCT No.: PCT/JP2016/005253
§ 371 (c)(1),
(2) Date: Jul. 26, 2018

(87) PCT Pub. No.: WO2017/130263
PCT Pub. Date: Aug. 3, 2017

(65) Prior Publication Data
US 2019/0035094 A1    Jan. 31, 2019

(30) Foreign Application Priority Data

Jan. 29, 2016  (JP) ................................ 2016-016446
Nov. 17, 2016  (JP) ................................ 2016-224383

(51) Int. Cl.
*G06T 7/33*    (2017.01)
*G06T 3/00*    (2006.01)
*G06T 7/00*    (2017.01)

(52) U.S. Cl.
CPC ............ *G06T 7/337* (2017.01); *G06T 3/0068* (2013.01); *G06T 7/0012* (2013.01);
(Continued)

(58) Field of Classification Search
CPC ....... G06T 7/33; G06T 3/0068; G06T 7/0012; G06T 7/0016
See application file for complete search history.

(56) References Cited

U.S. PATENT DOCUMENTS

2015/0235369 A1    8/2015  Ishida et al.
2016/0314587 A1   10/2016  Ishikawa et al.

FOREIGN PATENT DOCUMENTS

| EP | 1669928 A2 | 6/2006 |
|---|---|---|
| WO | 2011/052515 A1 | 5/2011 |
| WO | 2015/044838 A1 | 4/2015 |

*Primary Examiner* — Sam Bhattacharya
(74) *Attorney, Agent, or Firm* — Canon U.S.A., Inc. IP Division

(57) ABSTRACT

An image processing apparatus in which identification of a corresponding target point between images is easily performed, and physically appropriate registration can be performed by using the identification is provided. The image processing apparatus obtains coordinate transformation for respectively transforming a first image and a second image obtained by imaging an object to a first transformed image and a second transformed image, obtains correspondence information that serves as information of a corresponding point included in each of the first transformed image and the second transformed image, respectively transforms the correspondence information to positions in the first image and the second image, and obtains deformation transformation for performing registration of the first image and the second image on the basis of information of the corresponding points in the first image and the second image.

21 Claims, 9 Drawing Sheets

(52) U.S. Cl.
CPC .............. *G06T 7/0016* (2013.01); *G06T 7/33* (2017.01); *G06T 2207/10081* (2013.01); *G06T 2207/10088* (2013.01); *G06T 2207/10101* (2013.01); *G06T 2207/10104* (2013.01); *G06T 2207/10108* (2013.01); *G06T 2207/30068* (2013.01)

IMAGE PROCESSING APPARATUS, IMAGE PROCESSING METHOD, IMAGE PROCESSING SYSTEM, AND PROGRAM

CROSS-REFERENCE TO RELATED APPLICATIONS

This application is a national phase application of international application PCT/JP2016/005253, filed on Dec. 28, 2016, and claims the benefit of, and priority to, Japanese Patent Application No. 2016-016446, filed Jan. 29, 2016, and Japanese Patent Application No. 2016-224383, filed Nov. 17, 2016, which applications are hereby incorporated by reference herein in their entireties.

TECHNICAL FIELD

The disclosure of the present specification relates to an image processing apparatus, an image processing method, an image processing system, and a program.

BACKGROUND ART

A technology for registering and displaying a plurality of images and analyzing the images is used, for example, for image diagnosis in a medical field. To improve an accuracy of the registration, information of corresponding points that are points corresponding between the images on which the registration is performed may be obtained and used for the registration in some cases. In view of the above, a technology for supporting the obtainment of the information of the corresponding points has been proposed. For example, PTL 1 and PTL 2 describes that, with regard to images obtained by imaging different shapes of the same object (subject), coordinate transformation based on a particular structure of the object is applied to each of images to have the corresponding points easily identified by visual observation, and the information of the corresponding points between the images to which the coordinate transformation has been applied is obtained.

When the coordinate transformation is applied to each of the plurality of images such that it is facilitated to identify the corresponding points, the shape of the object drawn in the deformed image may be significantly different from the shape of the object drawn in the original image in some cases. Therefore, while it is facilitated to identify the corresponding points by performing the application of the coordinate transformation, it may become difficult to perform the registration between the deformed images on which the coordinate transformation has been applied in some cases.

CITATION LIST

Patent Literature

PTL 1: US2016/314587
PTL 2: US2015/235369

SUMMARY OF INVENTION

According to some embodiments of the present invention, an image processing apparatus includes a coordinate transformation obtaining unit configured to obtain information related to coordinate transformation for respectively transforming a first image and a second image obtained by imaging an object to a first transformed image and a second transformed image, an information obtaining unit configured to obtain correspondence information that serves as information of a corresponding point included in each of the first transformed image and the second transformed image, a transformation unit configured to transform a position of the corresponding point included in the first transformed image to a position in the first image and a position of the corresponding point included in the second transformed image to a position in the second image on the basis of the correspondence information obtained by the information obtaining unit and the coordinate transformation obtained by the coordinate transformation obtaining unit, and a deformation transformation obtaining unit configured to obtain information related to deformation transformation for performing registration of the first image and the second image on the basis of information of the corresponding points respectively transformed to the positions in the first image and the second image by the transformation unit.

Advantageous Effects of Invention

According to the exemplary embodiments of the present invention, since the information of the corresponding points obtained between the images on which the coordinate transformation for the deformation to the images with which it is facilitated to identify the corresponding points is transformed to the information of the corresponding points in the original images, it is possible to obtain the deformation transformation for the registration in accordance with the features of the original images. As a result, since the registration can be performed on the basis of the original images in a case where it is difficult to perform the registration between the images deformed so as to be facilitated to identify the corresponding points, it is possible to provide the system for performing the highly accurate registration.

Further features of the present invention will become apparent from the following description of exemplary embodiments with reference to the attached drawings.

DESCRIPTION OF EMBODIMENTS

Hereinafter, exemplary embodiments of the present invention will be described with reference to the drawings.

First Embodiment

A plurality of images including images obtained by a plurality of image acquisition apparatuses (modalities), on different dates and times, at different body postures, or in different image acquisition modes may be used for image diagnosis in a medical field, for example. In the image diagnosis using the plurality of images, registration between the plurality of images may be performed in some cases. To improve the accuracy of the registration, for example, an operation is performed to associate structures and the like drawn in the respective images with one another as corresponding points by visual observation.

While a first image and a second image obtained by imaging an object in mutually different deformed states are used as inputs, an image processing apparatus 100 according to a first exemplary embodiment obtains deformation transformation for performing registration between the first image and the second image. Subsequently, the image processing apparatus 100 generates a deformed image obtained by deforming one of the first image and the second image to be matched with the other image. To obtain the corresponding points used for the registration and to obtain corresponding positions between the input images, the first image and the second image are projected onto a space where it is easy to compare the images with each other to be observed, for example, a normalized space. Subsequently, the image processing apparatus 100 obtains the corresponding positions by an operation input by a user or the like on the images projected onto the normalized space. Furthermore, the image processing apparatus 100 projects the positions corresponding to the obtained positions onto a space of the original image, that is, a real space, which is a space defined by the coordinate system of the modality, and performs registration on the basis of regularization information for taking into account an appropriateness of physical deformation of the object (applying regularization to the deformation) in this real space. Herein, the real space refers to a space defined by image coordinate systems of the first image and the second image corresponding to a space defined by the image coordinate systems of the images obtained through the image acquisition by the modalities. The normalized space will be described below in detail.

Figure 1:
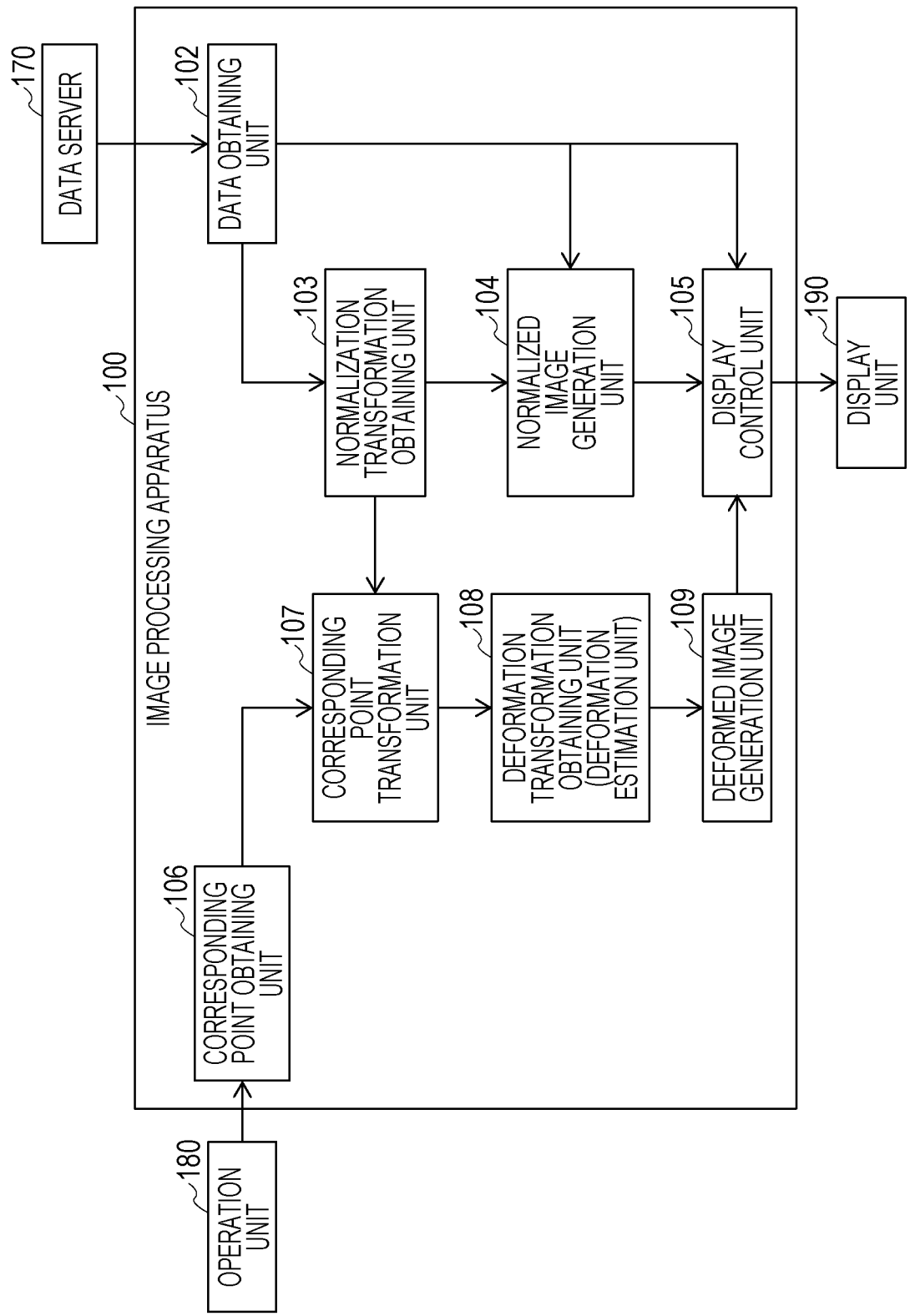
FIG. 1 illustrates an example of a function configuration of an image processing apparatus according to first to third exemplary embodiments.

FIG. 1 is a block diagram illustrating an example of a function configuration of the image processing apparatus 100. The image processing apparatus 100 is connected to a data server 170, an operation unit 180, and a display unit 190.

The data server 170 is connected to the image processing apparatus 100 via a network and holds the first image and the second image which will be described below. The first image and the second image held by the data server 170 are medical images obtained by imaging the object in advance in respectively different conditions. Herein, the conditions include types of the modalities used for the image acquisition, image acquisition modes, dates and times, body postures of the object, and the like. The medical images include, for example, three-dimensional tomographic images acquired by modalities such as a magnetic resonance imaging (MRI) apparatus, an X-ray computed tomography (CT) apparatus, an ultrasonic imaging apparatus, a photoacoustic tomography (PAT) apparatus, a positron emission tomography (PET)/single photon emission computed tomography (SPECT) apparatus, an optic coherence tomography (OCT) apparatus, and the like. According to the first exemplary embodiment, the first image and the second image are two medical images obtained by imaging the same object corresponding to the two medical images obtained by imaging the same object in respectively different deformation states. The first image and the second image may also be, for example, images acquired by different modalities or in different image acquisition modes around the same time or images obtained by imaging the same patient by the same modality in the same body posture at different dates and times for follow-up observations. The first image and the second image are input to the image processing apparatus 100 via a data obtaining unit 102.

The operation unit 180 is, for example, a mouse or a key board. The operation unit 180 accepts an operation by a user. Positions of corresponding points between the first image and the second image which are specified by the user through an operation input via the operation unit 180 are input to the image processing apparatus 100 via a corresponding point obtaining unit 106.

The display unit 190 performs display on the basis of an output from the image processing apparatus 100. For example, a display image generated by the image processing apparatus 100 is displayed, and a graphical user interface (GUI) for obtaining an instruction from the user is provided.

The image processing apparatus 100 includes the data obtaining unit 102, a normalization transformation obtaining unit 103, a normalized image generation unit 104, a display control unit 105, the corresponding point obtaining unit 106, a corresponding point transformation unit 107, a deformation transformation obtaining unit (deformation estimation unit) 108, and the deformed image generation unit 109. The data obtaining unit 102 obtains the first image and the second image which are the input images from the data server 170. The normalization transformation obtaining unit 103 obtains coordinate transformation for deforming each of the first image and the second image to an image with which it is facilitated to identify the corresponding point. According to the first exemplary embodiment, the normalization transformation obtaining unit 103 obtains normalization transformations with regard to the first image and the second image. The normalization transformation obtaining unit 103 is an example of a coordinate transformation obtaining unit. The normalized image generation unit 104 generates a first normalized image and a second normalized image corresponding to normalized images obtained by performing the normalization transformation of each of the first image and the second image. The normalized image generation unit 104 is an example of a transformed image generation unit. The display control unit 105 displays the first image, the second image, the first normalized image, the second normalized image, and a deformed image which will be described below on the display unit 190 in accordance with the operation input by the user or control based on a predetermined program. The display control unit 105 also functions as an output unit configured to output data of the image that can be displayed to an external apparatus such as the display unit 190, for example. The corresponding point obtaining unit 106 obtains information related to the positions of the corresponding points on the first normalized image and the second normalized image in accordance with the operation input on the operation unit 180 by the user. The corresponding point obtaining unit 106 is an example of an information obtaining unit. The corresponding point transformation unit 107 transforms corresponding point positions from the normalized space to the real space corresponding to the space of the respective original images on the basis of the normalization transformations. The corresponding point transformation unit 107 is an example of a transformation unit. The deformation transformation obtaining unit (deformation estimation unit) 108 performs deformation estimation between the first image and the second image on the basis of the corresponding point positions in the transformed real space and obtains the deformation transformation between the images. The deformation transformation obtaining unit 108 is an example of a deformation transformation obtaining unit. The deformed image generation unit 109 deforms at least one of the first image and the second image on the basis of the deformation transformation between the images to generate a registered first deformed image or a registered second deformed image. Hereinafter, a position of a single point or each of a plurality of points on one image specified as the corresponding point that is a point indicating the position corresponding to the position on the other image will be referred to as a corresponding point position.

Figure 2:
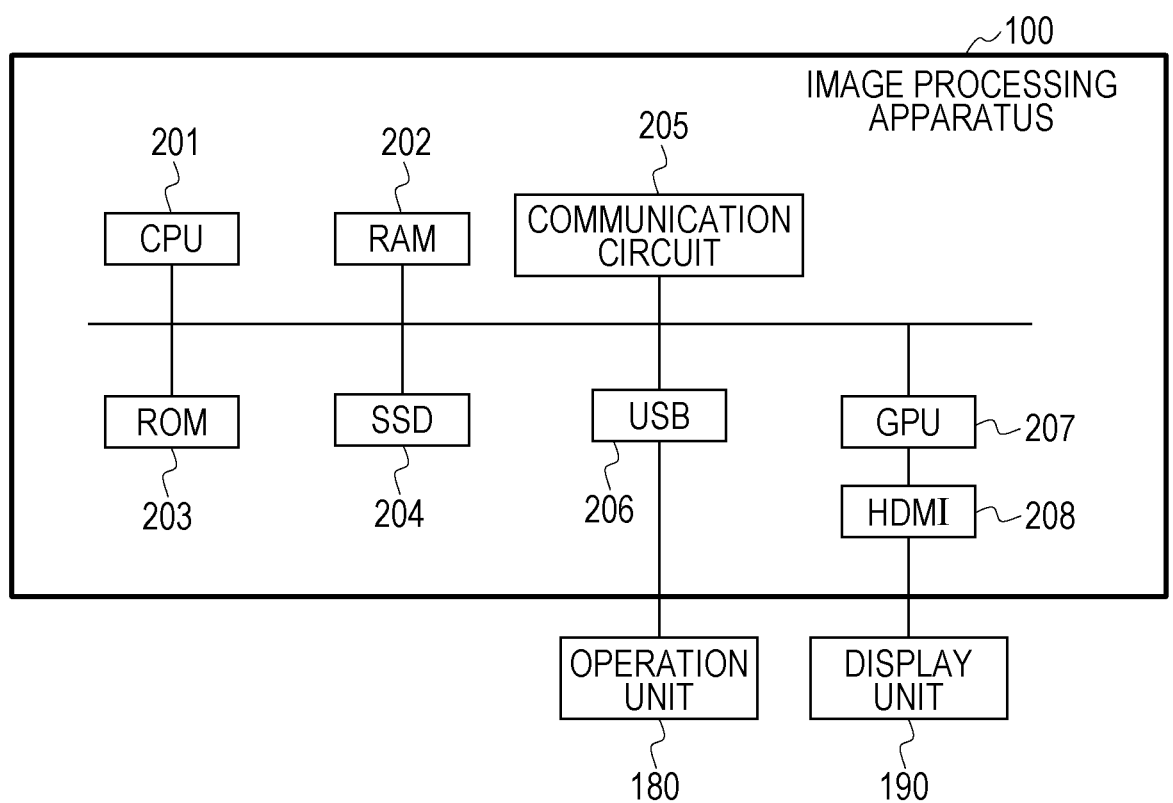
FIG. 2 illustrates an example of a hardware configuration of the image processing apparatus according to the first to third exemplary embodiments.

FIG. 2 illustrates an example of a hardware configuration of the image processing apparatus 100. The image processing apparatus 100 is a computer, for example. The image processing apparatus 100 includes a central processing unit (CPU) 201 functioning as a main control unit, a random access memory (RAM) 202 functioning as a memory unit, a read only memory (ROM) 203, a solid state drive (SSD) 204, a communication circuit 205 functioning as a communication unit, a universal serial bus (USB) 206 functioning as a connection unit, High Definition Multimedia Interface (HDMI) (registered trademark) 208, and a graphics processing unit (GPU) 207 functioning as a graphics control unit, and these components are connected via an internal bus so as to be communicable to one another. The CPU 201 is a control circuit configured to control the image processing apparatus 100 and the respective units connected to the image processing apparatus 100 in an integrated manner. The RAM 202 is a memory that stores a program for executing processing in the image processing apparatus 100 and the respective units connected to the image processing apparatus 100 and various parameters used for image processing. The RAM 202 stores a control program executed by the CPU 201 and temporarily stores various pieces of data used when the CPU 201 executes various controls. The ROM 203 stores a program or data in which a control procedure by the CPU 201 is stored. The SSD 204 stores a program or data. The communication circuit 205 performs a communication with the data server 170 via a network. The USB 206 is connected to the operation unit 180. The GPU 207 is an image processing unit and executes image processing in accordance with the control from the CPU 201. An image obtained as a result of the image processing is output to the display unit 190 via the HDMI (registered trademark) 208 to be displayed. The operation unit 180 and the display unit 190 may be integrated with each other as a touch panel monitor.

According to an exemplary embodiment, the functions of the respective configurations illustrated in FIG. 1 are realized while the CPU 201 executes the programs stored in the RAM 202, the ROM 203, and the SSD 204. According to another exemplary embodiment, the functions of the respective configurations illustrated in FIG. 1 are realized by the GPU 207 and a circuit such as a field-programmable gate array (FPGA) (not illustrated) in addition to the CPU 201 described above. In this case, at least one of processings including an input to the GPU 207 and the FPCA (not illustrated), a setting of a parameter related to the image processing, and a reception of an output from the GPU 207 and FPGA (not illustrated) is controlled by the CPU 201. The function of the display control unit 105 is realized by the CPU 201 and the GPU 207. At this time, the CPU 201 instructs the GPU 207 to display predetermined information on the display unit 190 and generates display data used for the GPU 207 to perform the display on the display unit 190 to output the display data to the display unit 190. According to another exemplary embodiment, the communication circuit 205 is realized by a single network interface card (NIC) or a plurality of NICs when appropriate. According to another exemplary embodiment, a plurality of CPUs 201 may be included in the apparatus.

Figure 3:
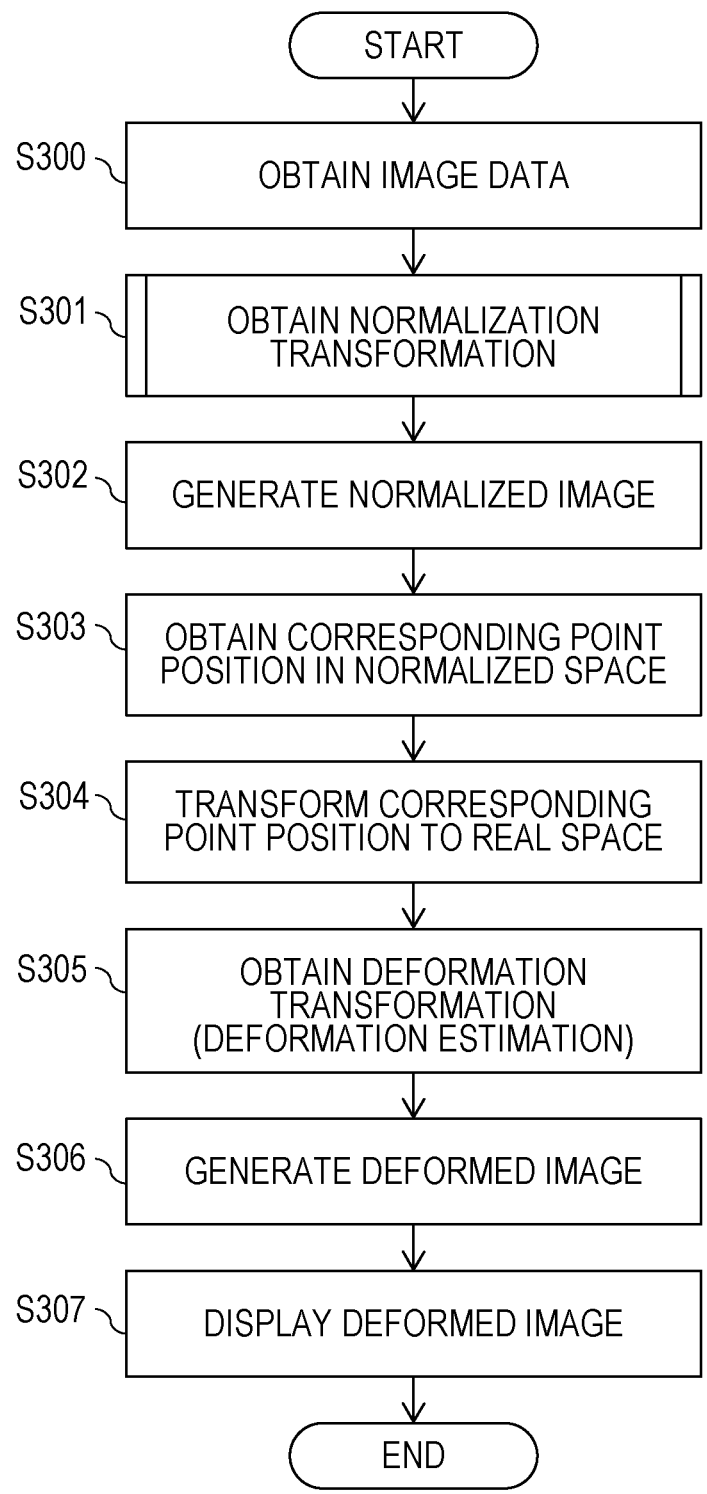
FIG. 3 is a flow chart illustrating an example of processing performed by the image processing apparatus according to the first to third exemplary embodiments.
Figure 4A:
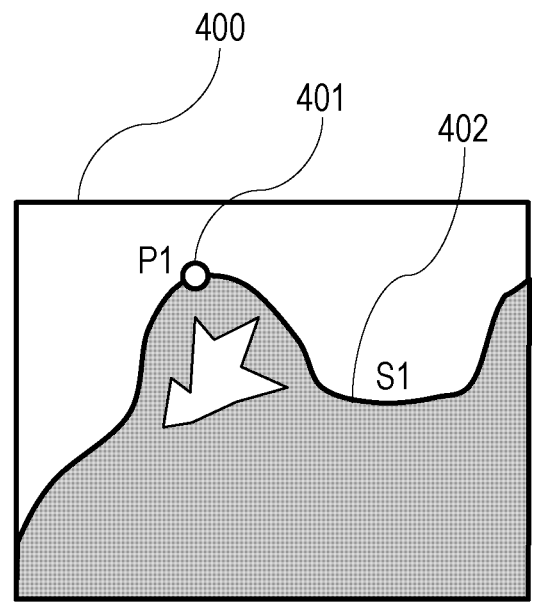
FIG. 4A illustrates an example of the processing performed by the image processing apparatus according to the first to third exemplary embodiments.
Figure 4B:
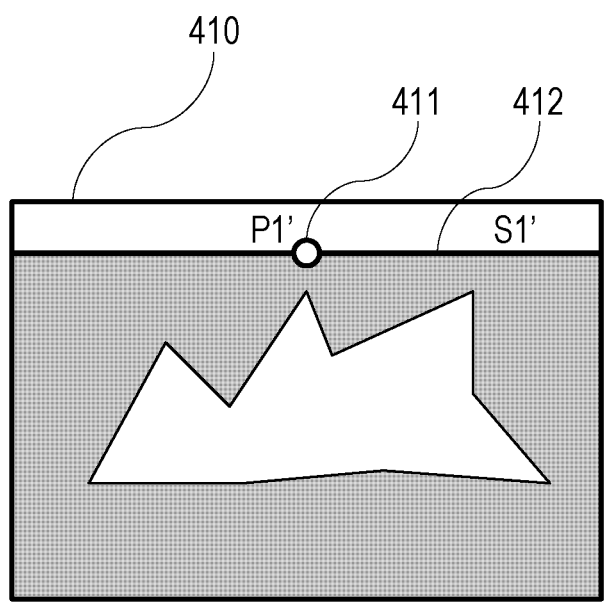
FIG. 4B illustrates an example of the processing performed by the image processing apparatus according to the first to third exemplary embodiments.
Figure 5:
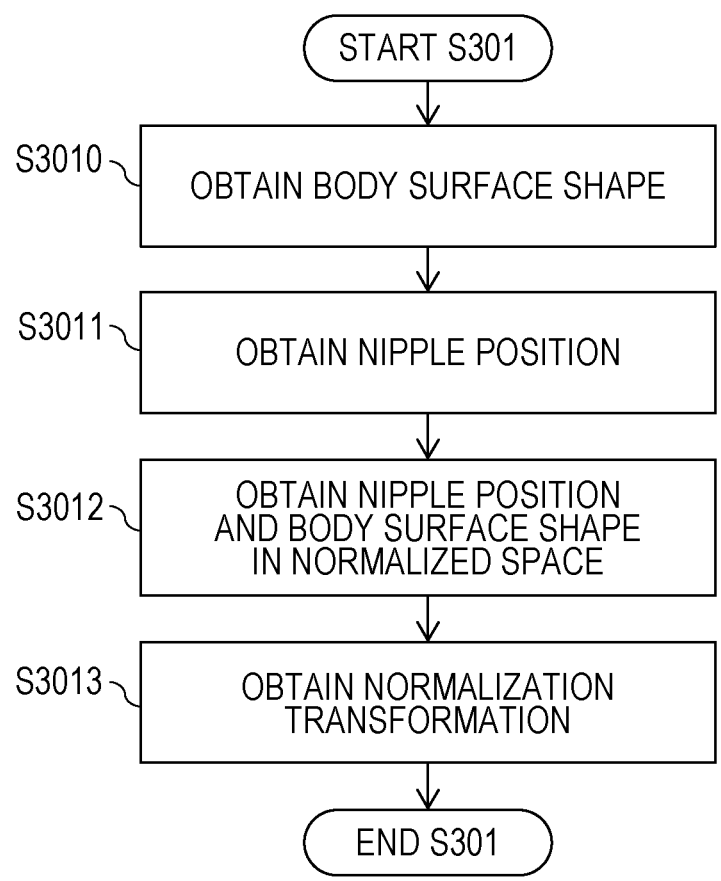
FIG. 5 is a flow chart illustrating an example of processing performed by the image processing apparatus according to the first to third exemplary embodiments.
Figure 6:
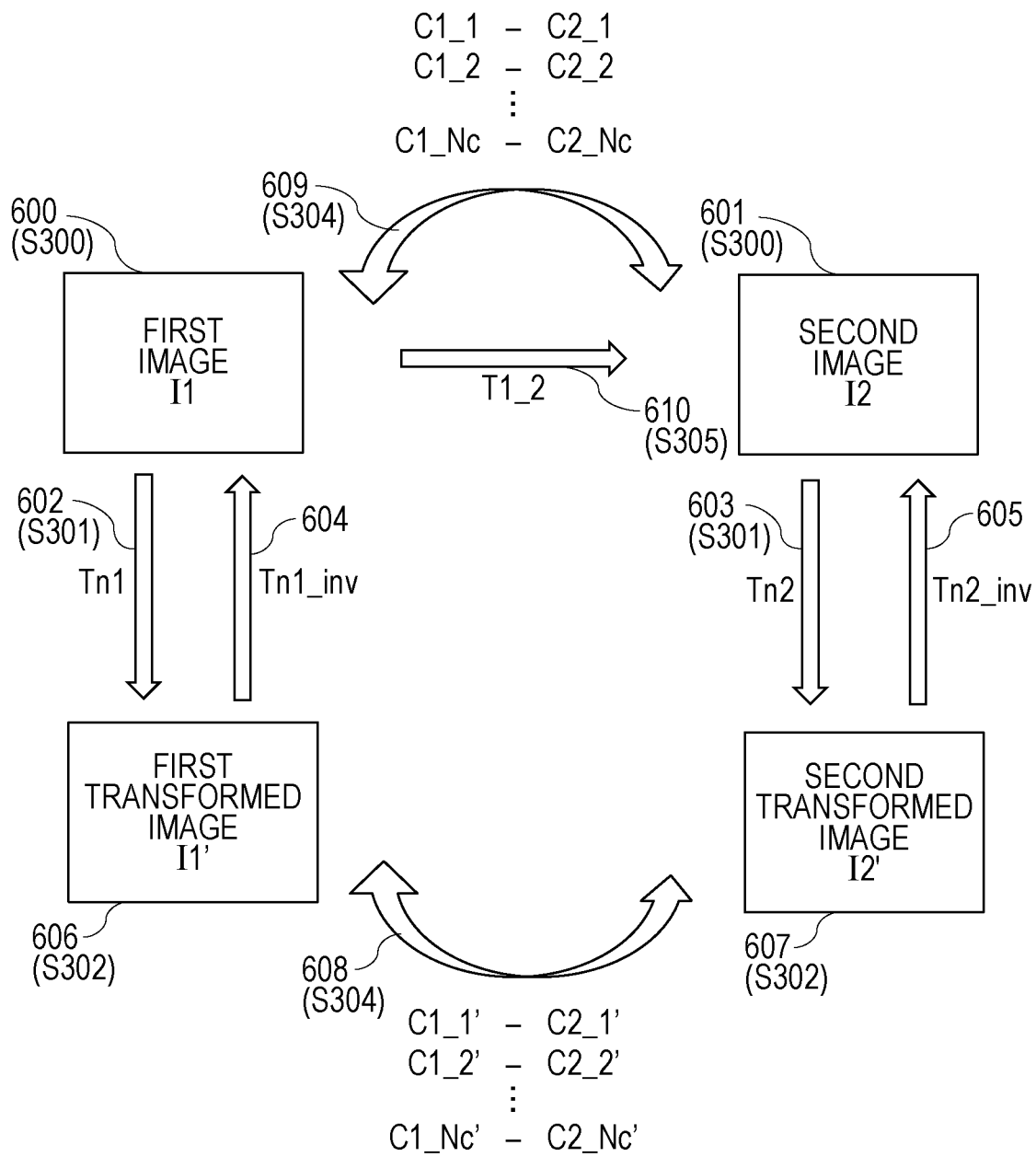
FIG. 6 illustrates an example of processing performed by the image processing apparatus according to an exemplary embodiment of the present invention.

FIG. 3 is a flow chart illustrating an example of the entirety of the processing performed by the image processing apparatus 100. FIGS. 4A and 4B are explanatory diagrams for describing an example of processing in step S301. FIG. 5 is a flow chart illustrating an example of the processing in step S301. FIG. 6 illustrates an example of the entirety of the processing performed by the image processing apparatus 100. Hereinafter, the processing performed by the image processing apparatus 100 will be described by appropriately referring to FIG. 3 to FIG. 6.

<Step S300: Obtainment of the Image Data>

In step S300 illustrated in FIG. 3, the data obtaining unit 102 obtains the first image and the second image from the data server 170. According to the first exemplary embodiment, a case where an MRI image is obtained as the first image and a PAT image is obtained as the second image will be described as an example. Hereinafter, according to the first exemplary embodiment, the first image is denoted by I1, and the second image is denoted by I2. Herein, the first image I1 and the second image I2 are obtained by imaging the breast of the same object in different deformed states. The shape of the breast to be drawn varies in the first image I1 and the second image I2 since the object takes different body postures at the time of the MRI imaging and the time of the PAT imaging or an MRI apparatus and a PAT apparatus come to contact with the breast. It should be noted however that the first image I1 and the second image I2 are respectively three-dimensional images, and the image coordinate system is defined in each of the images. According to the first exemplary embodiment, a space defined by the image coordinate systems of the first image I1 and the second image I2 will be referred to as a real space. The processing in step S300 is processing of obtaining a first image I1 (600) and a second image I2 (601) illustrated in FIG. 6.

<Step S301: Obtainment of the Normalization Transformation>

In step S301 illustrated in FIG. 3, the normalization transformation obtaining unit 103 obtains a first normalization transformation Tn1 and a second normalization transformation Tn2 for respectively transforming the first image I1 and the second image I2 to the normalized images. That is, processing of obtaining transformations for projecting the first image I1 and the second image I2 having the coordinate systems defined on the real space onto the normalized space is executed. The processing in step S301 is processing of obtaining a coordinate transformation Tn1 (602) and a coordinate transformation Tn2 (603) illustrated in FIG. 6.

The normalization according to the first exemplary embodiment refers to coordinate transformations for respectively transforming the first image and the second image to a first transformed image and a second transformed image on the basis of a contour of a target site of the object and a reference point on the contour. More specifically, the normalization according to the first exemplary embodiment refers to coordinate transformations for projecting positions and shapes of anatomical features in the first image and the second image corresponding to the images of the object obtained in a plurality of different deformed states onto a common space (normalized space) in which those anatomical features have substantially the same positions and shapes. The normalization transformation corresponding to the coordinate transformation of the normalization according to the first exemplary embodiment is coordinate transformation to the normalized space in which the positions and shapes of the anatomical features of the respective images have substantially the same positions and shapes on the basis of the positions and shapes of the anatomical features such as the nipple commonly drawn in the first image I1 and the second image I2 acquired in the different deformed states and the body surface. The first transformed image obtained by performing the normalization transformation of the first image will be referred to as the first normalized image. In addition, the second transformed image obtained by performing the normalization transformation of the second image will be referred to as the second normalized image. Hereinafter, an example of a method of obtaining the normalization transformation will be described.

FIG. 4A is a schematic diagram of the first image I1. The first image according to the first exemplary embodiment is a three-dimensional MRI image, and a cross-sectional image 400 illustrated in FIG. 4A is a schematic diagram illustrating a certain cross-sectional image of the first image I1. In step S300, the normalization transformation obtaining unit 103 obtains a position coordinate P1 of a nipple 401 of the object and shape information S1 of a body surface 402 from the cross-sectional image 400 of the first image I1. These pieces of information are obtained as position information in the coordinate system of the first image I1, that is, position information in the real space.

FIG. 4B is a schematic diagram illustrating a certain cross-sectional image of a first normalized image I1' generated in step S302 which will be described below. In step S300, the normalization transformation obtaining unit 103 obtains the coordinate transformation for deforming the first image I1 represented by the cross-sectional image 400 of FIG. 4A to the first normalized image I1' represented by a cross-sectional image 410 of FIG. 4B. A nipple 411 in the cross-sectional image 410 of the first normalized image I1 illustrated in FIG. 4B is located at a coordinate position P1' obtained by performing the normalization transformation obtained in step S300 with respect to the position coordinate P1 of the nipple 401 in the cross-sectional image 400 of the first image I1 illustrated in FIG. 4A. Similarly, a body surface 412 is represented by a shape S1' obtained by transforming the body surface 402 of FIG. 4A by the normalization transformation. The body surface 412 is a shape located on a predetermined plane in the first normalized image I1'. In addition, a geodesic distance along the body surface with respect to the nipple 411 on the respective positions on the body surface 412 is set to maintain substantially the same distance before and after the normalization transformation. That is, the body surface 402 of FIG. 4A does not expand or contract by the normalization transformation while the nipple 401 is set as the center or is transformed to the body surface 412 of FIG. 4B within a small expansion and contraction range.

The processing executed by the normalization transformation obtaining unit 103 in step S301 to obtain the above-described normalization transformation will be described in detail with reference to the flow chart of FIG. 5.

<Step S3010: Obtainment of the Body Surface Shape>

In step S3010 illustrated in FIG. 5, the normalization transformation obtaining unit 103 obtains a body surface shape of the object in the first image I1. In this processing, for example, the image processing such as edge detection is performed on the first image I1 so that it is possible to automatically obtain the body surface shape. Alternatively, the first image I1 may be displayed on the display unit 190 via the display control unit 105 so that the user can observe the first image I1, and the body surface shape may be obtained on the basis of the operation input by the user or the like. The body surface shape obtained at this time is denoted by S1. According to the first exemplary embodiment, S1 is constituted by a point group representing the body surface shape, and the point group is obtained as position information in the coordinate system of the first image I1, that is, the position information in the real space.

<Step S3011: Obtainment of the Nipple Position>

In step S3011, the normalization transformation obtaining unit 103 obtains the nipple position of the object in the first image I1. In this processing, for example, the nipple position can be obtained by performing the image processing such as the edge detection on the first image. Alternatively, the nipple position can be obtained while an inflection point of a curvature of the shape, a peak position, or the like may be obtained on the basis of the body surface shape S1 obtained in step S3010. In addition, the nipple position may be obtained on the basis of an input operation by the user or the like. According to the first exemplary embodiment, the obtained nipple position is denoted by P1. The nipple position P1 is obtained as the position information in the coordinate system of the first image, that is, the position information in the real space.

<Step S3012: Obtainment of the Nipple Position and the Body Surface Shape in the Normalized Space>

In step S3012, the normalization transformation obtaining unit 103 obtains the nipple position and the body surface shape in the normalized space, that is, the coordinate system of the first normalized image I1'. Hereinafter, the nipple position in the normalized space is denoted by P1'. According to the first exemplary embodiment, P1' is set as an origin position (x, y, z)=(0, 0, 0) in the normalized space. In addition, hereinafter, the body surface shape in the normalized space is denoted by S1'. S1' is constituted by a point group in the normalized space. According to the first exemplary embodiment, S1' is located on a plane at y=0 in the normalized space. The x coordinate values and the z coordinate values of the respective points constituting S1' are set such that a change in the geodesic distance along the body surface with respect to the nipple before and after the normalization becomes small. In addition, the position of S1' in the normalized space is set such that a mutual distance of the point group constituting S1 is maintained. The position of S1' is determined, for example, by a technique in the related art including a low-strain dimensionality reduction method such as a multi-dimensional scaling method.

<Step S3013: Obtainment of the Normalization Transformation>

In step S3013, the normalization transformation obtaining unit 103 obtains the first normalization transformation Tn1 for normalizing the first image I1 on the basis of positional relationships between P1 and P1' and S1 and S1'. Specifically, the nomalization transformation can be obtained by using a deformation interpolation method or a deformation obtaining technique in the related art such as a free form deformation (FFD) method or a thin plate spline (TPS) method. For example, in a case where the FFD method is used, optimization of the deformation is carried out by performing iterative calculation such that the positions of the respective points constituting P1 and S1 of the first image I1 corresponding to the original image come close to P1' and S1' after the normalization transformation. At this time, the normalization transformation is preferably obtained on the basis of a condition for suppressing distortion of the space, abrupt change, extreme expansion or contraction, or the like caused by the transformation. For example, the normalization transformation may also be obtained by adding a restraint for suppressing a fluctuation of the distance from the body surface caused by the normalization transformation at a position inside the breast of the object. That is, the normalization transformation refers to nonlinear transformation to the normalized space deformed such that the position and the shape of the body surface of the object are substantially matched in the first normalized image I1' and a second normalized image I2'.

With the above-described processing, the first normalization transformation Tn1 is obtained. Herein, Tn1 is a transformation function for transforming a position coordinate x in the image coordinate system of the first image I1 to a position coordinate x' in the coordinate system of the first normalized image I1' which will be described below. According to the first exemplary embodiment, an action of the first normalization transformation Tn1 is represented by Expression 1.

$$x' = Tn1(x) \quad (1)$$

Furthermore, in step S3013, the normalization transformation obtaining unit 103 obtains an inverse transformation Tn1_inv of the first normalization transformation Tn1 obtained in the above-described processing. At this time, an action of Tn1_inv can be represented by Expression 2.

$$x = Tn1\_inv(x') \quad (2)$$

That is, Tn1_inv is a transformation function for transforming the position coordinate x' in the image coordinate system of the first normalized image I1' to the position coordinate x in the image coordinate system of the first image I1. Tn1_inv is such a transformation that an error of the inverse transformation ($\Sigma \|x - Tn1\_inv(Tn1(x))\|$) becomes as small as possible with respect to Tn1. It should be noted however that, when a certain transformation T is defined, a method for obtaining an inverse transformation T_inv thereof has been proposed in the related art, and therefore detailed descriptions will be omitted.

In step S3010 to S3013 described above, the case where the first normalization transformation Tn1 with regard to the first image I1 and the inverse transformation Tn1_inv thereof are obtained has been described. Furthermore, in the processing in step S301, the normalization transformation obtaining unit 103 according to the first exemplary embodiment executes processing similar to the processing in step S3010 to S3013 described above with respect to the second image I2. That is, a body surface shape S2 and a nipple position P2 are detected from the second image I2, and a second normalization transformation Tn2 for normalizing the second image I2 and an inverse transformation Tn2_inv thereof are obtained on the basis of these pieces of information. In the above-described manner, in step S301, the first normalization transformation Tn1 (602) and an inverse transformation Tn1_inv (604) thereof and the second normalization transformation Tn2 (603) and an inverse transformation Tn2_inv (605) thereof which are illustrated in FIG. 6 are obtained.

<Step S302: Generations of the Normalized Image>

In step S302, the normalized image generation unit 104 generates the first normalized image I1' obtained by deforming the first image I1 obtained in step S300 on the basis of the first normalization transformation Tn1 obtained in step S301. Similarly, the normalized image generation unit 104 generates the second normalized image I2' obtained by deforming the second image I2 on the basis of the second normalization transformation Tn2. At this time, the processing of generating the deformed image obtained by deforming the image on the basis of the transformation function may be executed by using any of techniques in the related art. In addition, the inverse transformations Tn1_inv and Tn2_inv of the respective normalization transformations may be used in the image transformation. That is, in step S302, a first normalized image I1' (606) and a second normalized image I2' (607) illustrated in FIG. 6 are obtained.

<Step S303: Obtainment of the Corresponding Point in the Normalized Space>

In step S303, the corresponding point obtaining unit 106 obtains positions of a plurality of corresponding points between the first normalized image I1' and the second normalized image I2'. Hereinafter, this position will be referred to as a corresponding point position in the normalized space. A point used as the corresponding point according to the first exemplary embodiment is, for example, a feature point representing a distinctive structure of the object such as a vascular bifurcation point. That is, the corresponding point obtaining unit 106 obtains the position of the same feature point of the object such as the vascular bifurcation point commonly drawn in the first normalized image I1' and the second normalized image I2' as the corresponding point position in the normalized space. Herein, the corresponding point position in the normalized space is a group of pairs of position information in the respective coordinate systems of the first normalized image I1' and the second normalized image I2' (normalized image coordinate systems). According to the first exemplary embodiment, i-th corresponding point positions in the normalized space are denoted by C1_i' and C2_i'. Herein, a suffix i represents an index of the corresponding point. According to the first exemplary embodiment, the number of corresponding points obtained in step S303 is set as Nc. That is, 1 is lower than or equal to i, and also i is lower than or equal to Nc. The corresponding point positions assigned with the same index represent mutually corresponding positions. That is, it is represented that a position of a certain single (i-th) feature point in the object is drawn at a position C1_i' in the first normalized image, and the same bifurcation point is drawn at a position C2_i' in the second normalized image.

An example of the method of obtaining the corresponding point position in the normalized space includes a method of obtaining the corresponding point position by an operation input by the user. That is, the display control unit 105 displays the first normalized image I1' and the second normalized image I2' output from the normalized image generation unit 104 and cross-sectional images thereof on the display unit 190, so that the user can observe the respective images. Subsequently, the user who has observed the respective images can find the corresponding positions between the images. In particular, when an XZ cross section of the normalized image is displayed, a cross section where a region at a position at an equal distance from the body surface is cut out is displayed. At this time, a Y coordinate on the XZ cross section represents a distance from the body surface, that is, a depth, and the user can operate the Y coordinate on the XZ cross section to be displayed. According to this configuration, since the region at the equal distance from the body surface is drawn in the same plane, an advantage is attained that it is facilitated to grasp an overall picture of the vessel or the like that runs along the body surface. In addition, since the distance (depth) from the body surface of the region in the object is hardly changed even when the object is deformed, this information can be used as reference information when the corresponding points are identified between the images. For example, by comparing the XZ cross sections in the vicinity of the same Y coordinate with each other, it is possible to efficiently perform the identification of the corresponding points. When the user inputs the corresponding positions via the operation unit 180, the corresponding point obtaining unit 106 can obtain the information of the corresponding points. Herein, the operation unit 180 is, for example, an input device such as a mouse or a key board. As a result, the corresponding point obtaining unit 106 can obtain the corresponding point positions in the normalized space found by the user. Subsequently, when an instruction for ending the corresponding point input is received from the user, the corresponding point obtaining unit 106 transmits the corresponding point positions in the normalized space obtained up to this time to the corresponding point transformation unit 107. Then, the flow proceeds to the processing in step S304. Herein, as compared with the first image I1 and the second image I2, since the first normalized image I1' and the second normalized image I2' have been subjected to the normalization transformation, the common anatomical features of the object drawn in both the images are at spatially close positions. For this reason, an advantage is attained that it is more facilitated for the user to find the corresponding point positions as compared with a case where the first image I1 and the second image I2 are visually observed.

It should be noted however that the method of obtaining the corresponding point positions in the normalized space is not limited to the above-described method, and the corresponding point positions may be automatically obtained by performing the image processing on the images including the first normalized image I1' and the second normalized image I2'. For example, the corresponding point obtaining unit 106 detects a plurality of feature points from the respective images and performs association on the basis of position information related to the plurality of feature points, luminance patterns of the images, or the like, so that the corresponding point positions in the normalized space can be obtained. A specific method for the processing may be executed by using any of techniques in the related art. As compared with the first image I1 and the second image I2, since the first normalized image I1' and the second normalized image I2' have been subjected to the normalization transformation, the common anatomical features of the object drawn in both the images are at spatially close positions. For this reason, in a case where the method of automatically obtaining the corresponding point positions is performed instead of using the first image I1 and the second image I2, an advantage is attained in terms of accuracy, stability, and calculation processing load.

In the above-described manner, in step S303, correspondence information (608) corresponding to the information of the corresponding points in the normalized space illustrated in FIG. 6 is obtained.

<Step S304: Transformation of the Corresponding Point Position to the Real Space>

In step S304, the corresponding point transformation unit 107 transforms the corresponding point positions in the normalized space obtained in step S303 on the basis of the inverse transformations $Tn1\_inv$ and $Tn2\_inv$ of the normalization transformation obtained in step S301 to obtain the corresponding point positions in the real space. The obtainment of the corresponding point position in the real space is performed by calculation processing specifically represented by the following expression.

$$C1\_i = Tn1\_inv(C1\_i') \text{ (1 is lower than or equal to } i, \text{ and also } i \text{ is lower than or equal to } Nc) \quad (3)$$

$$C2\_i = Tn2\_inv(C2\_i') \text{ (1 is lower than or equal to } i, \text{ and also } i \text{ is lower than or equal to } Nc) \quad (4)$$

Where $C1\_i$ (1 is lower than or equal to i, and also i is lower than or equal to Nc) denotes the corresponding point position on the first image I1 corresponding to the i-th corresponding point position $C1\_'$ on the first normalized image I1' (1 is lower than or equal to i, and also i is lower than or equal to Nc). Similarly, $C2\_i$ (1 is lower than or equal to i, and also i is lower than or equal to Nc) denotes the corresponding point position on the second image I2 corresponding to the i-th corresponding point position $C2\_i'$ on the second normalized image I2' (1 is lower than or equal to i, and also i is lower than or equal to Nc). According to the first exemplary embodiment, $C1\_i$ and $C2\_i$ described above (1 is lower than or equal to i, and also i is lower than or equal to Nc) are collectively referred to as the corresponding point position in the real space.

In the above-described manner, in step S304, correspondence information (609) corresponding to the information of the corresponding point in the real space illustrated in FIG. 6 is obtained.

<Step S305: Obtainment of the Deformation Transformation>

In step S305, the deformation transformation obtaining unit (deformation estimation unit) 108 executes processing of obtaining the deformation transformation between the first image I1 and the second image I2 on the basis of the corresponding point position in the real space obtained in step S304. The deformation transformation is obtained on the basis of the information of the regularizing the deformation of the object in the real space. The processing of obtaining the deformation transformation may also be regarded as deformation estimation processing of estimating deformation between the images or deformation registration processing of performing deformation registration between the images.

Herein, any of techniques in the related art may be used for the deformation processing between the images based on the corresponding point position in the real space, and the deformation processing can be executed by using the TPS method, for example. According to this method, it is possible to obtain the deformation transformation with which $C1\_i$ and $C2\_i$ (1 is lower than or equal to i, and also i is lower than or equal to Nc) corresponding to the position coordinate values on the respective images of the first image I1 and the second image I2 are matched with each other, and also bending energy caused by the deformation is minimized. Specifically, each $C1\_i$ (1 is lower than or equal to i, and also i is lower than or equal to Nc) is transformed to C2_$i$ (1 is lower than or equal to i, and also i is lower than or equal to Nc), and the spatial distortion in the real space caused by the transformation is defined as energy. The energy of the distortion can be defined as a value calculated by a spatial secondary differentiation of the deformation transformation, for example. Subsequently, the deformation transformation with which the total amount of the energy of the distortion is minimized is obtained. That is, the deformation transformation obtaining unit (deformation estimation unit) 108 obtains the deformation transformation on the basis of the information of the regularizing the deformation so as to be an appropriate deformation in the real space of the object. The obtainment of the deformation transformation based on the information of the regularization is not limited to the case based on the value calculated by the spatial secondary differentiation of the above-described deformation transformation. For example, the definition can also be made on the basis of a size of the specially high frequency component of the displacement amount based on the deformation transformation, a size of a local volume change rate based on the deformation transformation, or the like.

In addition, the obtainment of the deformation transformation can be executed on the basis of the information of the nipple position and the body surface shape in the first image I1 and the second image I2. For example, the deformation transformation can be obtained by further adding a restraint for matching the nipple position P1 in the first image I1 and the nipple position P2 in the second image I2 with each other. Moreover, the deformation transformation can be obtained by further adding a restraint for matching the body surface shapes S1 and S2 with each other. At this time, since the point groups respectively constituting the body surface shapes S1 and S2 are not associated with each other, it is necessary to perform the registration between a curved surface of the body surface represented by the point group constituting the body surface shape S1 and a curved surface of the body surface represented by the point group constituting the body surface shape S2. This processing can be executed by a technique in the related art such as, for example, an iterative closest point (ICP) method. In addition, after the deformation transformation obtained by the TPS method on the basis of the corresponding point position or the nipple position in the real space is applied to the body surface shape S1 to obtain a deformed shape having a shape closer to the body surface shape S2, the association of the point group on the body surface shape may be performed between the point groups representing the two shapes by using the ICP method or the like. Subsequently, while the information of the associated point group on the body surface is added, the deformation transformation may be obtained by the TPS method again. Furthermore, the obtainment of the deformation transformation and the update of the association may be repeatedly executed until convergence is realized.

As a result, it is possible to obtain the deformation transformation from the first image I1 to the second image I2, that is, the transformation for projecting the position x1 in the coordinate system of the first image I1 onto the corresponding position x2 in the coordinate system of the second image I2. According to the first exemplary embodiment, the deformation transformation is denoted by T1_2. At this time, an action of T1_2 can be represented by Expression 5.

$$x2 = T1\_2(x1) \tag{5}$$

That is, in a case where an arbitrary position in the object is drawn at a position of the coordinate x1 in the first image I1 and drawn at a position of the coordinate x2 in the second image, the deformation transformation T1_2 provides the transformation from x1 to x2. It should be noted however that, in step S305, the deformation transformation obtaining unit (deformation estimation unit) 108 may further obtain an inverse transformation of the above-described deformation transformation T1_2, that is, the deformation transformation from the second image I2 to the first image I1. Since the obtainment of the inverse transformation is similar to the obtainment of the inverse transformation of the normalization transformation described in step S3013, descriptions thereof will be omitted. Herein, the inverse transformation of T1_2 is denoted by T2_1. At this time, an action of T2_1 can be represented by Expression 6.

$$x1 = T2\_1(x2) \tag{6}$$

With the above-described processing, the deformation transformation between the first image I1 and the second image I2 is obtained. In the processing in step S305, a deformation transformation (610) from the first image I1 illustrated in FIG. 6 to the second image I2 is obtained. Even if an attempt is made to perform the registration by deforming at least one of the first normalized image I1' and the second normalized image I2', it is difficult to use the information of the regularization on which a physical validity of the deformation in the real space is reflected. According to the first exemplary embodiment, the corresponding point position in the normalized space which is deformed such that it is facilitated to identify the corresponding point is transformed to the corresponding point position in the real space, and it is possible to obtain the deformation transformation for performing the registration on which the physical validity of the deformation in the real space is reflected.

<Step S306: Generation of the Deformed Image>

In step S306, the deformed image generation unit 109 generates a first deformed image I1_$d$ obtained by such a deformation that the first image I1 is substantially matched with the second image I2 on the basis of the deformation transformation T1_2 obtained in step S305. In addition, the deformed image generation unit 109 may generate a second deformed image I2_$d$ obtained by such a deformation that the second image I2 is substantially matched with the first image I1 on the basis of the deformation transformation T2_1 obtained in step S305. It should be noted however that the method of generating the deformed image by using the deformation transformation has been proposed in the related art, and therefore detailed descriptions will be omitted.

<Step S307: Display of the Deformed Image>

In step S307, the display control unit 105 performs control to display the first deformed image I1_$d$ and the second deformed image I2_$d$ generated in step S306 on the display unit 190. In addition, the display control unit 105 may display the first image I1 and the second deformed image I2_$d$ in a manner that the images can be compared with each other on the display unit 190 in accordance with an input operation or the like by the user. Similarly, the first deformed image I1_$d$ and the second image I2 may be displayed in a manner that the images can be compared with each other on the display unit 190.

In the above-described manner, the processing of the image processing apparatus according to the first exemplary embodiment is executed. According to the first exemplary embodiment, it is possible to provide the system where the normalized image is displayed which is easy for the user who observes the images to perform the identification of the corresponding point position, and the image is deformed on the basis of the corresponding point position specified on the image. After the corresponding point on the normalized image which is input by the user is transformed to the corresponding position on the original input image, the deformation between the images can be obtained. Therefore, it is possible to perform the transformation on which the physical restraint in the real space such as the minimization of the bending energy related to the deformation in the original input image, that is, the information of the regularization is reflected. That is, it is possible to obtain the deformation transformation in conformity to the physical actual condition with regard to the deformation of the object. In particular, in a case where the first image and the second image are the images in the real space, various algorithms related to the registration which has been proposed thus far can be used.

Modified Example 1-1

According to the first exemplary embodiment, as the processing in step S301, the normalization transformation for transforming the points at an equal distance from the body surface to the same plane is performed. However, the method for the coordinate transformation to facilitate the identification of the corresponding point is not limited to the above. For example, by using the technology described in PTL 2, the normalization transformation for transforming the points at an equal distance from the nipple position in the image to the same plane may be obtained.

In addition, as another modified example, the coordinate transformation based on the chest wall shape of the object may be used. For example, the above-described coordinate transformation can be used in a case where the MRI images or the CT images capturing a range wider than the surrounding of the breast corresponding to the object are used as the first image and the second image. In this case, the chest wall shape is also drawn in both the first image and the second image in addition to the nipple position and the body surface shape. For this reason, as the processing of obtaining the normalization transformation executed in step S301 by the normalization transformation obtaining unit 103, it is possible to obtain the normalization transformation based on the nipple position, the body surface shape, and the chest wall shape of the object which are drawn in the image. For example, by using the technology described in PTL 1, the normalization transformation for normalizing each of the first image and the second image can be obtained. According to this method, since it is possible to obtain the normalization transformation for projecting the deep part of the breast corresponding to the inspection target region of the object, that is, the chest wall located on an inner side with respect to the body surface of the object at a predetermined position, an advantage is attained that it is facilitated to perform the comparison between the image at the above-mentioned position.

In addition, according to the first exemplary embodiment, the case has been described as an example where the image of the breast is the target of the registration, but the target is not limited to the above. For example, an image of another organ such as heart or liver may also be the target of the registration. In this case, various normalization techniques in the related art for transforming the image of the target organ to the normalized space can be used. At this time, as a normalization method, similarly as in the first exemplary embodiment, the normalization based on the distance from the surface of the organ may also be used. In addition, as described in PTL 2, the normalization based on the distance from the particular landmark position may also be used.

Modified Example 1-2

According to the first exemplary embodiment, the case has been described as an example where, in step S303, the corresponding point position in the normalized space is obtained, and in step S304, the processing of transforming the corresponding point position in the normalized space to the corresponding point position in the real space is executed. However, the implementation of the present invention is not limited to the above. For example, the corresponding point position obtained in the processing in step S304 may also include the corresponding point position directly obtained from the first image and the second image corresponding to the image in the real space in addition to the position obtained by transforming the corresponding point position in the normalized space to the real space. In this case, the display control unit 105 performs control to display the first image and the second image on the display unit 190. Subsequently, the corresponding point obtaining unit 106 can obtain an anatomically characteristic position or the like commonly drawn in the respective images through the operation input by the user via the operation unit 180. Then, the obtained position may be added to the corresponding point position in the above-described real space. As a result, it is possible to additionally obtain the corresponding point position that is difficult to be identified in the normalized image and also can be identified in the original input image.

In addition, as another modified example, the corresponding point positions may be obtained in the plurality of transformed images obtained by the various coordinate transformations illustrated in the modified example 1-1 and respectively transformed to the corresponding point positions in the real space. For example, the transformed image on which the coordinate transformation has been performed such that it is facilitated to identify the corresponding point in the vicinity of the body surface of the object and the transformed image on which the coordinate transformation has been performed such that it is facilitated to identify the corresponding point inside the object may be used in combination. As a result, it is possible to perform the obtainment of the corresponding point more accurately.

According to these modified examples, since the processing in step S305 and the subsequent steps can be performed on the basis of still more corresponding point positions, an advantage is attained that the highly accurate deformation transformation can be obtained, and the deformed image can be displayed.

Modified Example 1-3

In the processing in step S305 according to the first exemplary embodiment, in addition to the above-described processing, the following processing may be further executed. That is, the information related to the corresponding point position in the real space obtained in step S304 and the nipple positions P1 and P2 and the body surface shapes S1 and S2 obtained in the processing in step S302 may be saved in the data server 170. In this case, the information is preferably saved while being associated with the first image I1 and the second image I2 obtained in step S300 by the data obtaining unit 102. In the processing in step S300, in addition to the above-described processing, the following processing may be further executed. That is, in a case where the data server 170 saves the information related to the corresponding point position, the nipple position, and the body surface shape in the real space which are associated with the first image I1 and the second image I2, the processing of reading out and obtaining these pieces of information may be performed. Subsequently, in a case where these pieces of information are read out and obtained, in the processing in step S301, the processing in steps S3010 and S3011 can be omitted, and the processing in steps S3012 and S3013 can be performed on the basis of the read information. In addition, the processing in steps S303 and S304 may be omitted. Alternatively, the corresponding point position in the real space obtained by executing the processing in steps S303 and S304 may be integrated with the corresponding point position in the real space obtained by the readout from the data server 170, and the subsequent processing may be executed. The processing for the transformation to the normalized space may be applied to the information such as the corresponding point position in the real space read from the data server 170 to be displayed on the display unit 190 together with the first normalized image I1' and the second normalized image I2'. In addition, the similar processing may be performed on not only the information read out from the data server 170 but also the information obtained in step S303 according to the first exemplary embodiment. As a result, the obtainment of the corresponding point position which uses the user operation can be executed in multiple courses, and it is possible to provide the system where the addition of the information of the corresponding point position or the like can be flexibly performed.

Second Embodiment: Embodiment Using the FFD Method

According to the first exemplary embodiment, the case has been described as an example where the deformation transformation between the images is obtained by the TPS method, but the implementation of the present invention is not limited to the above. According to a second exemplary embodiment, a case will be described where the deformation transformation between the images is obtained by using the free form deformation (FFD) method.

A function configuration according to the second exemplary embodiment is similar to FIG. 1 in which the function configuration according to the first exemplary embodiment is exemplified. Here, the descriptions thereof will be omitted. In addition, the entire processing procedure according to the second exemplary embodiment can be described with reference to FIG. 2 in which the processing procedure according to the first exemplary embodiment is exemplified. Hereinafter, a detail of the processing according to the second exemplary embodiment will be described.

In the processing in step S300 to step S304, the processing similar to that of the first exemplary embodiment is performed. Here, the descriptions thereof will be omitted.

<Step S305 According to Second Embodiment>

In step S305, the deformation transformation obtaining unit (deformation estimation unit) 108 executes the processing of obtaining the deformation transformation between the first image I1 and the second image I2 on the basis of the corresponding point positions $C1\_i$ and $C2\_i$ in the real space obtained by the transformation processing in step S304. According to the second exemplary embodiment, the deformation transformation for substantially matching each of the corresponding point positions $C1\_i$ and $C2\_i$ in the real space to each other is obtained by using the FFD method. The FFD method is a deformation representation method of arranging control points in a grid manner and obtaining the displacement amount in the space by using a control amount at each control point as a deformation parameter. The deformation representation obtainment based on the FFD method is a technique in the related art, and therefore detailed descriptions will be omitted. Here, the method of obtaining the control amount for determining a characteristic of the deformation transformation in the FFD method, that is, the deformation parameter will be described.

According to the second exemplary embodiment, the deformation transformation obtaining unit (deformation estimation unit) 108 obtains a deformation transformation $\Phi$ for minimizing a cost function represented by Expression 7.

$$E(\Phi) = E_{distance}(\Phi) + \lambda_{smoothness} E_{smoothness}(\Phi) + \lambda_{compression} E_{compression}(\Phi) \quad (7)$$

In Expression 7, $E_{distance}(\Phi)$ denotes a data term in the cost function. Specifically, the distance error of the corresponding point position caused by the deformation transformation is calculated by a calculation represented by Expression 8.

[Math. 1]

$$E_{distance}(\Phi) = \sum_{i=1}^{N} \|C2\_i - \Phi(C1\_i)\|^2 \quad (8)$$

Where $\Phi(x)$ represents a function for obtaining the position coordinate of the transformation result based on the deformation transformation $\Phi$ of the position coordinate x. $E_{smoothness}(\Phi)$ in Expression 7 is a regularization term (information of the regularization) for obtaining a smooth deformation and can be calculated by the bending energy of the deformation transformation $\Phi$ obtained by a calculation represented by Expression 9, for example.

[Math. 2]

$$E_{smoothness}(\Phi) = \iiint \left[ \left(\frac{\partial^2 \Phi}{\partial x^2}\right)^2 + \left(\frac{\partial^2 \Phi}{\partial y^2}\right)^2 + \left(\frac{\partial^2 \Phi}{\partial z^2}\right)^2 + 2\left(\frac{\partial^2 \Phi}{\partial x \partial y}\right) + 2\left(\frac{\partial^2 \Phi}{\partial x \partial z}\right) + 2\left(\frac{\partial^2 \Phi}{\partial y \partial z}\right) \right] dx dy dz \quad (9)$$

In Expression 7, $E_{compression}(\Phi)$ is a regularization term (information of the regularization) related to a local volume change in the spatial transformation caused by the deformation transformation $\Phi$ and can be calculated by a calculation represented by Expression 10, for example.

[Math. 3]

$$E_{compression}(\Phi) = \int_{\Omega} |\log[\det\{J(\Phi)\}]| dx \quad (10)$$

Where $J(\Phi)$ represents a function for returning a Jacobian matrix corresponding to a spatial differentiation related to the deformation transformation $\Phi$ and a function for returning a matrix of three rows and three columns according to the second exemplary embodiment where the three-dimensional deformation is set as the target. In addition, det( ) is a function for obtaining a determinant of a matrix of an argument. Expression 10 represents a calculation for a size of the local volume change in the spatial transformation caused by the deformation transformation Φ and spatially integrating the size.

In addition, in Expression 7, $\lambda_{smoothness}$ and $\lambda_{compression}$ respectively denote the regularization parameter related to the smoothness of the deformation and the regularization parameter related to the volume change and control the respective intensities of the influences of the regularizations.

According to the second exemplary embodiment, the deformation transformation Φ obtained by the above-described processing is denoted by T1_2. The deformation transformation T1_2 is the transformation function for transforming the position coordinate in the image coordinate system of the first image I1 to corresponding position coordinate in the image coordinate system of the second image I2.

In the processing in step S306 and step S307, the processing similar to that of the first exemplary embodiment is executed. Here, the descriptions thereof will be omitted.

With the above-described processing, the processing of the image processing apparatus according to the second exemplary embodiment is executed. According to the second exemplary embodiment, it is possible to obtain the deformation transformation in which the deformation accompanied with the local volume change of the object is suppressed as compared with the first exemplary embodiment. After the input corresponding point input by the user in the normalized space is transformed to the corresponding position on the original input image, the deformation transformation between the images can be obtained, so that it is possible to obtain the deformation transformation in which the local volume change with regard to the deformation in the original input image is suppressed. That is, with regard to the deformation of the object, it is possible to obtain the more highly accurate deformation transformation based on the information of the regularization in the real space.

Third Embodiment: Embodiment Using the Regularization in the Normalized Space in Combination According to the first exemplary embodiment and the second exemplary embodiment, the case has been described as an example where, when the deformation transformation between the first image I1 and the second image I2 is obtained, the application of the regularization with regard to the deformation of the object in the real space is performed. On the other hand, it is characterized in that the image processing apparatus according to a third exemplary embodiment further uses the regularization in the normalized space in combination.

The function configuration and the entire processing procedure according to the image processing apparatus according to the third exemplary embodiment are similar to those according to the second exemplary embodiment. It should be noted that part of the processing performed in step S305 by the deformation transformation obtaining unit (deformation estimation unit) 108 differs. Hereinafter, only the difference from the second exemplary embodiment will be described.

<Step S305 According to Third Embodiment>

In step S305, the deformation transformation obtaining unit (deformation estimation unit) 108 obtains the deformation transformation between the first image and the second image on the basis of the corresponding point position in the real space which is obtained in step S304. At this time, the deformation transformation obtaining unit (deformation estimation unit) 108 according to the third exemplary embodiment uses a function obtained by further adding a cost term (regularization term) for performing the regularization in the normalized space to the cost function for the obtainment of the deformation transformation defined by Expression 7 according to the second exemplary embodiment as the cost function for the obtainment of the deformation transformation. That is, the deformation transformation obtained in step S305 is configured to include the restraint of the regularization with regard to the deformation in the normalized space. Only this aspect is the difference from the processing performed in step S305 according to the second exemplary embodiment by the deformation transformation obtaining unit (deformation estimation unit) 108.

Hereinafter, a method of obtaining the cost term (regularization term) for performing the regularization in the normalized space will be described. First, the deformation transformation obtaining unit (deformation estimation unit) 108 obtains the deformation transformation T1_2' between the first normalized image I1' and the second normalized image I2' on the basis of a candidate value of the deformation transformation between the first image I1 and the second image I2 T1_2. Herein, the deformation transformation T1_2' between the first normalized image I1' and the second normalized image I2' is a deformation function that affects in the following manner.

$$x2'=T1\_2'(x1') \quad (11)$$

At this time, T1_2' can be obtained by linking the transform Tn1_inv from the first normalized image I1' to the first image I1, the transform T1_2 from the first image I1 to the second image I2, and furthermore, the transform Tn2 from the second image I2 to the second normalized image I2' in the stated order with one another. That is, these transformations satisfy a relationship of the following expression.

$$x2'=Tn2(T1\_2(Tn1\_inv(x1'))) \quad (12)$$

That is, T1_2' can be obtained with respect to the candidate value of the deformation transformation Φ (=T1_2). Therefore, similarly as in the real space, when an arbitrary regularization term in the normalized space is formulated, the value with respect to the candidate value of Φ can be obtained on the basis of T1_2'. As a specific example, it is possible to introduce regularization for suppressing a shear deformation between the body surface and the deep part in the normalized space. This regularization is effective to accurately estimate the deformation of the object.

According to the above-described method, since the body surface shape of the object corresponding to the curved surface in the first image I1 and the second image I2 is projected on a predetermined plane in the normalized space, an advantage is attained that the regularization in which the body surface shape of the object is used as the reference can be realized by the more simplified processing.

Fourth Embodiment: Embodiment in Which the Corresponding Point is Input on the Normalized Image According to the first exemplary embodiment, the case has been described as an example where the information related to the corresponding point position is obtained on the normalized image, but the present invention is not limited to the above. According to the fourth exemplary embodiment, a case will be described where the information related to the corresponding point position is obtained by further using the first deformed image obtained by the registration of the first image with respect to the second image.

Figure 7:
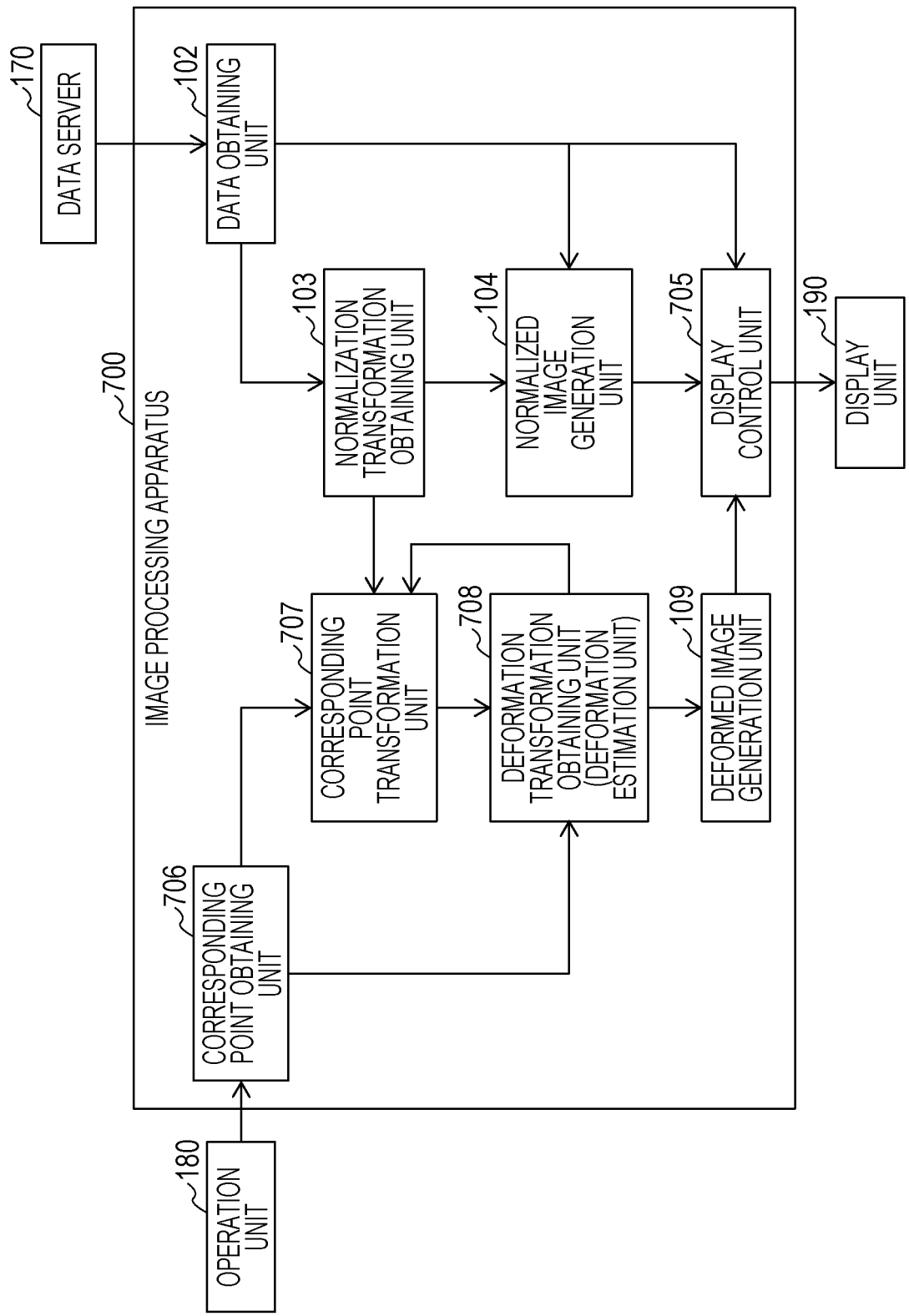
FIG. 7 illustrates an example of a function configuration of the image processing apparatus according to a fourth exemplary embodiment.

FIG. 7 is a block diagram illustrating an example of a function configuration of an image processing apparatus 700 according to the fourth exemplary embodiment. It should be noted however that configurations similar to those of FIG. 1 are assigned with the same reference symbols, and detailed descriptions thereof will be omitted here by citing the above-described explanations.

The image processing apparatus 700 includes the data obtaining unit 102, the normalization transformation obtaining unit 103, the normalized image generation unit 104, a display control unit 705, a corresponding point obtaining unit 706, a corresponding point transformation unit 707, a deformation transformation obtaining unit (deformation estimation unit) 708, and the deformed image generation unit 109.

The display control unit 705 displays the first image, the second image, the first normalized image, the second normalized image, the first deformed image, and a first normalized deformed image which will be described below on the display unit 190 in accordance with the operation input by the user or the control based on the predetermined program. The first normalized deformed image is an image obtained by normalizing the first deformed image.

The corresponding point obtaining unit 706 obtains the information related to the positions of the corresponding points on the first normalized image and the second normalized image in accordance with the operation input on the operation unit 180 by the user. In addition, the corresponding point obtaining unit 706 obtains the information related to the positions of the corresponding points on the first image and the second image. Moreover, the corresponding point obtaining unit 706 obtains the information related to the positions of the corresponding points on the first deformed image and the second image. Furthermore, the corresponding point obtaining unit 706 obtains the information related to the positions of the corresponding points on the first normalized deformed image and the second normalized image.

The corresponding point transformation unit 707 transforms the corresponding point position from the normalized space to the real space corresponding to the space of each of the original images on the basis of the normalization transformation obtained by the normalization transformation obtaining unit 103. In addition, the corresponding point transformation unit 707 transforms the corresponding point position on the first normalized deformed image to the position on the first deformed image on the basis of the normalization transformation. Moreover, the corresponding point transformation unit 707 transforms the corresponding point position on the first deformed image to the position on the first image on the basis of the deformation transformation obtained by the deformation transformation obtaining unit (deformation estimation unit) 708. That is, the corresponding point position on the first deformed image is transformed to the position in the real space corresponding to the space of the original image. Furthermore, the corresponding point transformation unit 707 transforms the positions of the corresponding points in the first image, the second image, and the first deformed image to the positions of each of the first normalized image, the second normalized image, and the first normalized deformed image on the basis of the normalization transformation. The corresponding point transformation unit 707 also transforms the corresponding point position in the first image to the position in the first deformed image on the basis of the deformation transformation.

The deformation transformation obtaining unit (deformation estimation unit) 708 performs the deformation estimation between the first image and the second image on the basis of the corresponding point position obtained in the real space and the corresponding point positions in the real space obtained on the normalized image, the deformed image, and the normalized deformed image and transformed to the real space and obtains the deformation transformation between the images.

A hardware configuration of the image processing apparatus 700 is similar to the example illustrated in FIG. 2. Detailed descriptions thereof will be omitted here by citing the above-described explanations.

Figure 8:
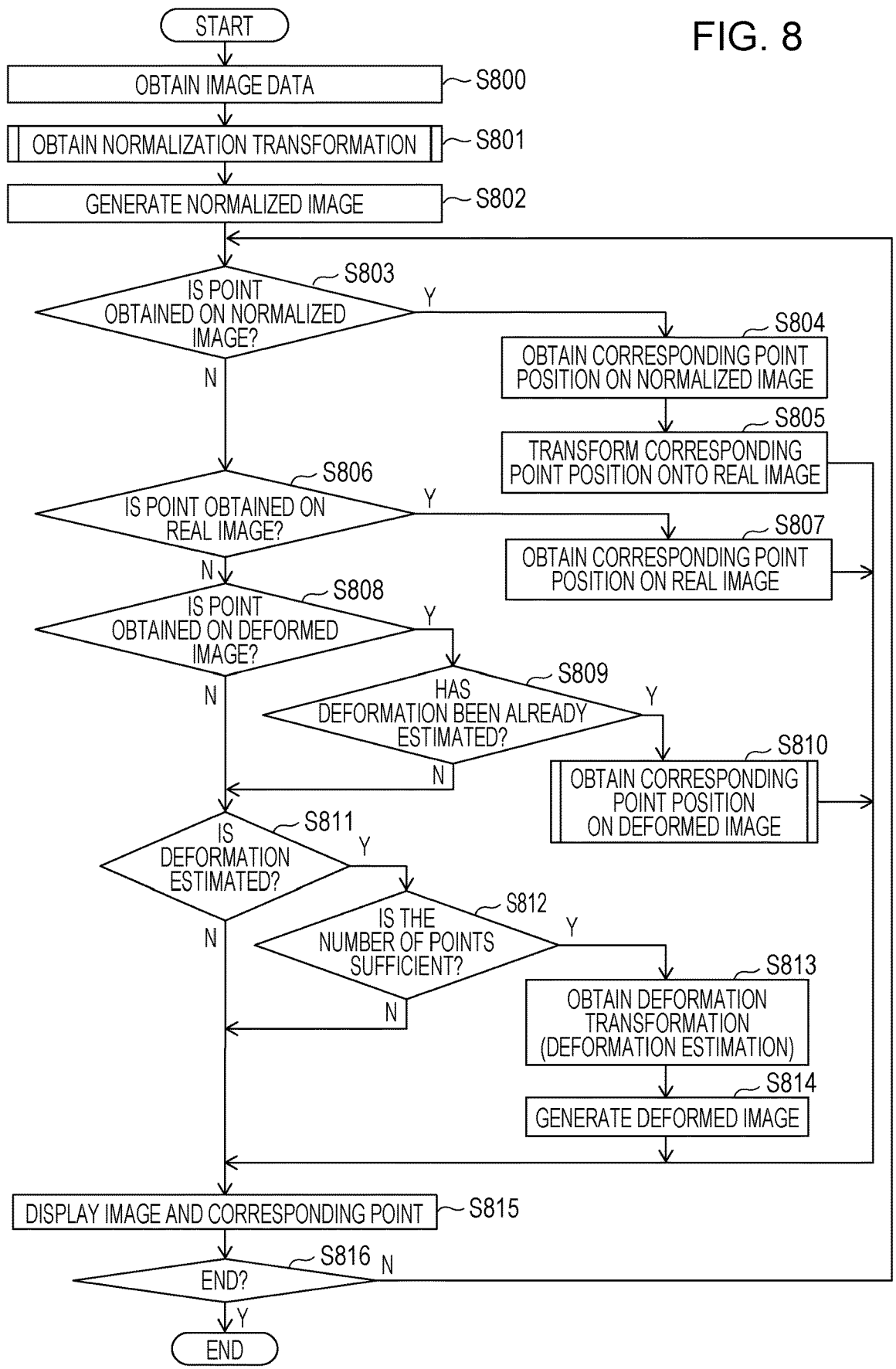
FIG. 8 is a flow chart illustrating an example of processing performed by the image processing apparatus according to the fourth exemplary embodiment.

FIG. 8 is a flow chart illustrating an example of the entirety of the processing performed by the image processing apparatus 700. Herein, the processing in step S800 to step S802 is similar to the processing in step S300 to step S302 illustrated in FIG. 3. The processing in step S804 and step S805 is similar to the processing in step S303 and step S304 illustrated in FIG. 3 except that the flow proceeds to step S815 after step S805. Detailed descriptions of the similar processing will be omitted here by citing the above-described explanations.

<Step S803: Determination on Whether or Not the Corresponding Point Position on the Normalized Image is Obtained>

In step S803, the corresponding point obtaining unit 706 determines whether or not the corresponding point position on the normalized image is obtained. For example, the corresponding point obtaining unit 706 obtains the information of the instruction input by the user via the operation unit 180 and performs the above-described determination in accordance with the content of the instruction. For example, the instruction is performed by the operation input for specifying the corresponding point on the normalized image displayed on the display unit 190. Alternatively, the instruction is performed by the operation input with respect to the user interface where it is possible to select the image for inputting the corresponding point which is displayed on the display unit 190. When it is determined that the corresponding point position on the normalized image is obtained, the flow proceeds to step S804. When it is not determined that the corresponding point position on the normalized image is obtained, the flow proceeds to step S806.

<Step S806: Determination on Whether or Not the Corresponding Point Position is Obtained on the real Image>

In step S806, the corresponding point obtaining unit 706 determines whether or not the corresponding point position is obtained on the real image. The real image includes the first image I1 and the second image I2. For example, the corresponding point obtaining unit 706 obtains the information of the instruction input by the user via the operation unit 180 and performs the above-described determination in accordance with the content of the instruction. For example, the instruction is performed by the operation input for specifying the corresponding point on the real image displayed on the display unit 190. Alternatively, the instruction is performed by the operation input with respect to the user interface where it is possible to select the image for inputting the corresponding point which is displayed on the display unit 190. When it is determined that the corresponding point position is obtained on the real image, the flow proceeds to step S807. When it is not determined that the corresponding point position is obtained on the real image, the flow proceeds to step S808.

<Step S807: Obtainment of the Corresponding Point on the Real Image>

In step S807, the corresponding point obtaining unit 706 obtains the corresponding point position between the first image I1 and the second image I2. The corresponding point obtaining unit 706 obtains the corresponding point position on the basis of the operation input with respect to each of the first image I1 and the second image I2 displayed on the display unit 190. When the corresponding point is obtained, the flow proceeds to step S815.

<Step S808: Determination on Whether or Not the Corresponding Point Position is Obtained on the Deformed Image>

In step S808, the image processing apparatus 700 determines whether or not the corresponding point position is obtained on the deformed image or the normalized deformed image. The deformed image is the first deformed image I1_$d$ obtained in step S814. The normalized deformed image is a first normalized deformed image I1_$d'$ obtained in step S814. For example, the corresponding point obtaining unit 706 obtains the information of the instruction input by the user via the operation unit 180 and performs the above-described determination in accordance with the content of the instruction. For example, the instruction is performed by the operation input for specifying the corresponding point on the deformed image displayed on the display unit 190. Alternatively, the instruction is performed by the operation input with respect to the user interface where it is possible to select the image for inputting the corresponding point which is displayed on the display unit 190. When it is determined that the corresponding point position is obtained on the deformed image, the flow proceeds to step S809. When it is not determined that the corresponding point position is obtained on the deformed image, the flow proceeds to step S811.

<Step S809: Determination on Whether or Not the Deformation Transformation has been Already Obtained>

In step S809, the deformation transformation obtaining unit 708 determines whether or not the deformation transformation has been already obtained. In a case where the deformation transformation T1_2 with regard to the first image I1 and the second image I2 has been already obtained by the deformation transformation obtaining unit 708, the flow proceeds to step S810. In a case where the deformation transformation T1_2 has not been already obtained, the flow proceeds to step S811.

<Step S810: Obtainment of the Corresponding Point Position on the Deformed Image>

In step S810, the corresponding point obtaining unit 706 obtains the corresponding point on the deformed image. Hereinafter, a case where the first deformed image I1_$d$ is generated from the first image I1 by the deformation transformation T1_2 will be described as an example. The corresponding point obtaining unit 706 obtains the corresponding point position between the first deformed image I1_$d$ and the second image I2. The obtained corresponding point position is transformed to a position in the real space by the deformation transformation T2_1. In addition, the corresponding point obtaining unit 706 obtains the corresponding point position between the first normalized deformed image I1_$d'$ and the second normalized image I2'. The obtained corresponding point position is transformed to a position in the real space by the inverse transformation of the normalization transformation Tn1_$d$ and the deformation transformation T1_2. The corresponding point obtaining unit 706 obtains information of the transformation of the corresponding point position obtained in the deformed image or the normalized deformed image to the corresponding point position in the real space. When the corresponding point is obtained, the flow proceeds to step S815.

Figure 9:
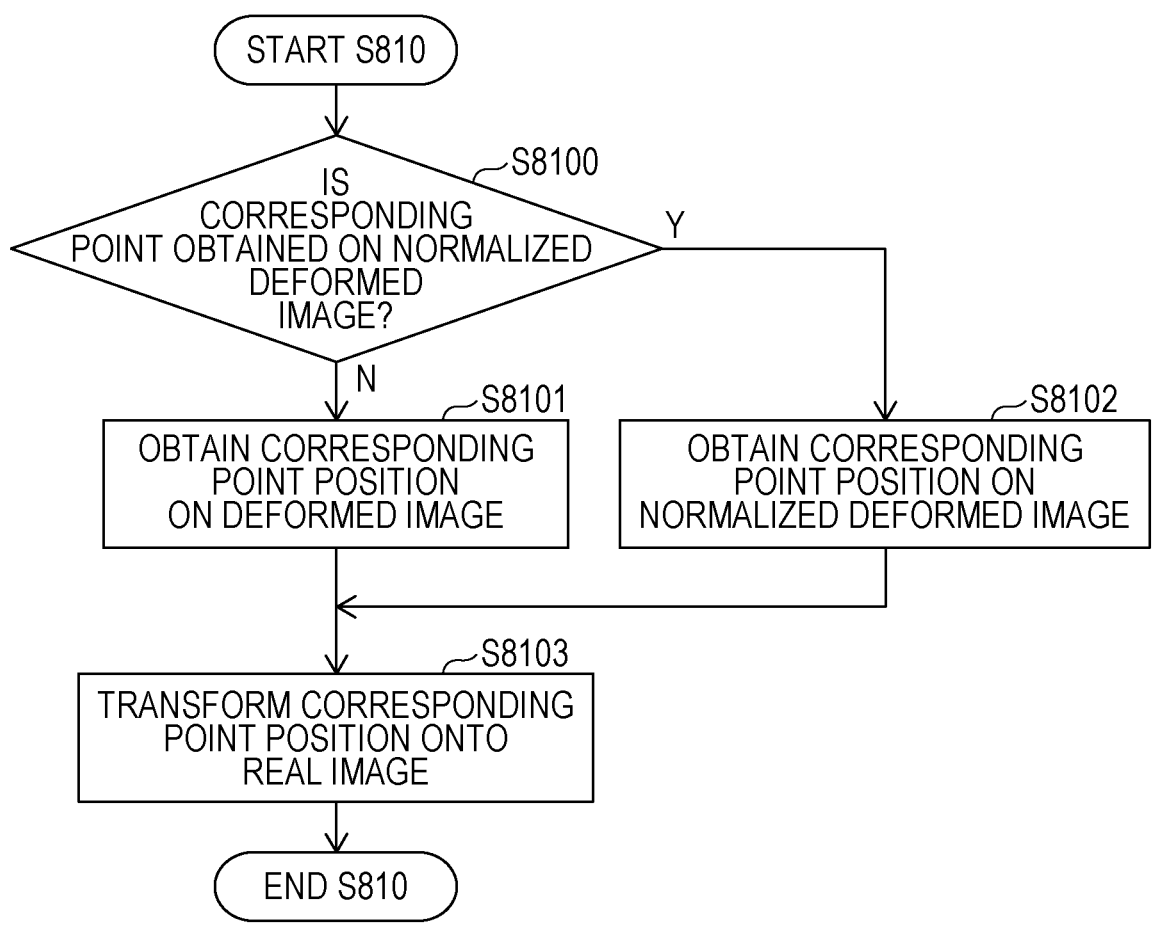
FIG. 9 is a flow chart illustrating an example of processing performed by the image processing apparatus according to the fourth exemplary embodiment.

FIG. 9 is a flow chart for describing an example of the processing in step S810.

<Step S8100: Determination on Whether or Not the Corresponding Point Position is Obtained on the Normalized Deformed Image>

In step S8100, the corresponding point obtaining unit 706 determines whether or not the corresponding point position is obtained on the normalized deformed image. The normalized deformed image refers to an image obtained by further normalizing the deformed image generated by the deformation transformation. The corresponding point obtaining unit 706 obtains the information of the instruction input by the user via the operation unit 180 and performs the above-described determination in accordance with the content of the instruction. The instruction is performed, for example, by the operation input for specifying the corresponding point on the normalized deformed image displayed on the display unit 190. Alternatively, the instruction is performed by the operation input with respect to the user interface where it is possible to select the image for inputting the corresponding point which is displayed on the display unit 190. When it is determined that the corresponding point position is obtained on the normalized deformed image, the flow proceeds to step S8103. When it is not determined that the corresponding point position is obtained on the normalized deformed image, the flow proceeds to step S8101.

<Step S8101: Obtainment of the Corresponding Point Position on the Deformed Image>

In step S8101, the corresponding point obtaining unit 706 obtains the corresponding point position between the first deformed image I1_$d$ and the second image I2. The corresponding point obtaining unit 706 obtains the corresponding point position between the first deformed image I1_$d$ and the second image I2 in accordance with the operation input by the user via the operation unit 180.

<Step S8102: Obtainment of the Corresponding Point Position on the Normalized Deformed Image>

In step S8102, the corresponding point obtaining unit 706 obtains the corresponding point position between the first normalized deformed image I1_$d'$ and the second normalized image I2'. The corresponding point obtaining unit 706 obtains the corresponding point position between the first normalized deformed image I1_$d'$ and the second normalized image I2' in accordance with the operation input by the user via the operation unit 180.

<Step S8103: Transformation of the Corresponding Point Position onto the Real Image>

In step S8103, the corresponding point transformation unit 707 transforms the corresponding point position obtained in the processing in step S8101 and step S8102 to the corresponding point position in the real space.

The corresponding point transformation unit 707 transforms the corresponding point position on the first deformed image I1_$d$ obtained in step S8101 on the basis of the deformation transformation T2_1 and obtains the corresponding point position on the first image I1, that is, the corresponding point position on the real image. The processing of transforming the corresponding point position in the first deformed image I1_$d$ to the corresponding point position in the first image I1 is represented, for example, by Expression 13.

$$C1 = T2\_1(C1\_d) \quad (13)$$

Where C1_*d* denotes the corresponding point specified on the first deformed image I1_*d*.

In addition, the corresponding point transformation unit 707 transforms the corresponding point position on the first normalized deformed image I1_*d'* on the basis of the normalization transformation Tn1_*d* and the deformation transformation T1_2 obtained in step S8102 and obtains the corresponding point position on the first image I1, that is, the corresponding point position on the real image. The processing of transforming the corresponding point position in the first normalized deformed image I1_*d'* to the corresponding point position in the first image I1 is represented, for example, by Expression 14.

$$C1 = T2\_1(Tn1\_d\_inv(C1\_d)) \quad (14)$$

Where Tn1_*d_inv* denotes the inverse transformation of Tn1_*d*, and the inverse transformation is obtained by a related-art method. In the above-described manner, the processing of obtaining the corresponding point position on the deformed image is executed, and the flow proceeds to step S815.

<Step S811: Determination on Whether or Not the Deformation Transformation is Obtained>

In step S811, the deformation transformation obtaining unit 708 determines whether or not the deformation transformation is obtained. For example, the deformation transformation obtaining unit 708 obtains the determination instruction by the operation input by the user via the operation unit 180. The instruction is performed by the operation input with respect to the user interface for instructing the obtainment of the deformation transformation. When it is determined that the deformation transformation is obtained, the flow proceeds to step S812. When it is not determined that the deformation transformation is obtained, the flow proceeds to step S815.

<Step S812: Determination on Whether or Not the Number of Corresponding Points is Sufficient>

In step S812, the deformation transformation obtaining unit 708 determines whether or not the number of corresponding points is sufficient for the obtainment of the deformation transformation. For example, the deformation transformation obtaining unit 708 determines that the number of corresponding points is sufficient in a case where the number is higher than a predetermined number. In a case where the number of corresponding points is sufficient, the flow proceeds to step S813. In a case where the number of corresponding points is not sufficient, the flow proceeds to step S815.

<Step S813: Obtainment of the Deformation Transformation>

In step S813, the deformation transformation obtaining unit (deformation estimation unit) 708 obtains the deformation transformation between the first image I1 and the second image I2 T1_2 on the basis of the corresponding point position in the real space obtained in up to step S813. Since the processing of obtaining the deformation transformation T1_2 is similar to the processing in step S305, detailed descriptions thereof will be omitted here by citing the above-described explanations.

<Step S814: Generation of the Deformed Image>

In step S814, the deformed image generation unit 109 generates the first deformed image I1_*d* obtained by such a deformation that the first image I1 is substantially matched with the second image I2 on the basis of the deformation transformation T1_2 obtained in step S813. In addition, the deformed image generation unit 109 may generate the second deformed image I2_*d* obtained by such a deformation that the second image I2 is substantially matched with the first image I1 on the basis of the deformation transformation T2_1 obtained in step S305. It should be noted however that the method of generating the deformed image by using the deformation transformation has been proposed in the related art, and therefore detailed descriptions will be omitted.

Furthermore, in step S814, the normalization transformation obtaining unit 103 obtains the normalization transformation Tn1_*d* for transforming the first deformed image I1_*d* to the normalized deformed image. The normalization transformation Tn1*d* is obtained by the method similar to step S801, that is, the processing exemplified in FIG. 5. It should be noted that the normalization transformation obtaining unit 103 obtains the body surface shape or the nipple position in the first deformed image I1_*d* by applying the deformation transformation T1_2 to the body surface shape or the nipple position of the first image I1 obtained in step S801 to be transformed to the shape and the position in the first deformed image. Furthermore, in step S814, the normalized image generation unit 104 transforms the first deformed image I1_*d* on the basis of the normalization transformation Tn1_*d* and generates the first normalized deformed image I1_*d'*. It should be noted however that, since the first deformed image I1_*d* is the image generated by deforming the first image I1 so as to be substantially matched with the second image I2, the first deformed image I1_*d* may be transformed on the basis of the second normalization transformation Tn2 obtained in step S801 to generate the first normalized deformed image I1_*d'*.

<Step S815: Display of the Image and the Corresponding Point>

In step S815, the display control unit 705 displays the information indicating the corresponding point position obtained in up to step S815 on the display unit 190. In addition, the display control unit 705 displays the deformed image generated in step S814 in the display unit 190. The display control unit 705 may further display other images generated in up to step S814 on the display unit 190. For example, the display control unit 705 may arrange and display the images generated in up to step S814 among the first image, the second image, the first normalized image, the second normalized image, the first deformed image, and the first normalized deformed image on the display unit 190 in a tiling manner. The display control unit 705 may display the corresponding point position in a manner that the image where the corresponding point is input can be distinguished from the others. For example, the display control unit 705 displays graphic symbols representing the corresponding point positions in different display modes (for example, different colors or shapes) in accordance with types of the images where the corresponding point is input. In addition, in a case where the deformation transformations T1_2 and T2_1 are noninvertible, the corresponding point positions that are obtained on the first deformed image or the first normalized deformed image and are not transformed are not matched with the positions obtained while those positions are transformed and further inversely transformed. Therefore, a configuration may be adopted in which the display control unit 705 does not display the graphic symbols representing the corresponding point positions that are obtained on the first deformed image or the first normalized deformed image and are not transformed on the first deformed image and the first normalized deformed image.

<Step S816: Determination on the End of the Entirety of the Processing>

In step S816, the image processing apparatus 700 determines whether or not the entirety of the processing is ended. For example, the image processing apparatus 700 obtains an end instruction in response to the operation input on the operation unit 180 by the user. The end instruction is performed by the operation input with respect to the user interface displayed on the display unit 190. In step S812, when it is determined that the number of corresponding points is insufficient, the display control unit 705 may display a screen for notifying the user that the number of corresponding points is insufficient on the display unit 190. When it is determined that the entirety of the processing is ended, the processing illustrated in FIG. 8 is ended. When it is not determined that the entirety of the processing is ended, the processing returns to step S803.

In the above-described manner, the processing of the image processing apparatus according to the fourth exemplary embodiment is executed. According to the fourth exemplary embodiment, it is possible to provide the system where the images are displayed in a manner that deformation states are matched with each other (by performing the deformation registration of one image to the other image) such that it is facilitated for the user who observes the images to perform the identification of the corresponding point position, and the image is deformed on the basis of the corresponding point position specified on the image. In addition, according to the fourth exemplary embodiment, after the corresponding point input on the first normalized image and the corresponding point input on the first deformed image are transformed to the positions on the first image, it is possible to perform uniform management together with the corresponding point input on the first image. In the above-described manner, since the corresponding point is managed at the position on the first image, even after the deformation transformation is updated, the corresponding point position is transformed to the appropriate position on the first deformed image.

Modified Examples of Fourth Embodiment

Modified Example 4-1

According to the fourth exemplary embodiment, the case has been described where the graphic symbols representing the corresponding point positions that are obtained on the first deformed image and are not transformed are not displayed on the first deformed image. However, the implementation of the present invention is not limited to the above, and the graphic symbol representing the corresponding point position obtained on the first deformed image and transformed and inversely transformed and the graphic symbol representing the corresponding point position obtained on the first image and transformed and inversely transformed may be displayed in different display modes.

Modified Example 4-2

According to the fourth exemplary embodiment, the case has been described where the first image is registered to the second image to generate the first deformed image, and the information related to the corresponding point position on the generated first deformed image and the second image is obtained. The present invention is not limited to the above, and the information related to the corresponding point position between the second deformed image and the first image may be obtained. Alternatively, the information related to the corresponding point position between the deformed images obtained by deforming the first image and the second image may be obtained.

Modified Example 4-3

According to the fourth exemplary embodiment, the case has been described where the corresponding point is input on the original image, the deformed image, the normalized image, and the normalized deformed image. However, the implementation of the present invention is not limited to the above, and a configuration may be adopted in which the normalized image and/or the normalized deformed image is not generated, and the corresponding point is not input is not input.

Modified Example 4-4

The processing performed by the image processing apparatus according to the fourth exemplary embodiment 700 is exemplified in FIG. 8 and FIG. 9, but the order of the processing is not limited to the above. For example, the processing constituted by steps S803, S804, and S805, the processing constituted by steps S806 and S807, and the processing constituted by steps S808, S809, and S810 may be performed in an order different from the order exemplified in FIG. 8. In addition, the example has been illustrated in which the flow proceeds to step S815 when each of steps S805, S807, and S810 is ended, but the order of the processing is not limited to the above. For example, when each of steps is ended, after the display processing of the corresponding point is performed, the flow may proceed to each of next steps (S806 in the case of S805, S808 in the case of S807, and S811 in the case of S810). The example has been illustrated in which the determination is performed in steps S803, S806, and S808 in the stated order, but the order of the processing is not limited to the above. For example, the image processing apparatus 700 may stand by in a mode for standing by for an instruction of the user, and the flow may proceed to a specific step on the basis of the operation input for selecting the image where the corresponding point is input.

Modified Example 4-5

According to the fourth exemplary embodiment, the example has been described in which pieces of information of the input corresponding point positions by using various images are respectively transformed to the corresponding point positions in the real space. The image processing apparatus 700 may attach the information of the corresponding point positions in the real space to the real image, that is, at least one of the first image and the second image. According to the fourth exemplary embodiment, in step S805 or step S8103, the processing of respectively transforming the corresponding point positions to the real space is performed, but the processing of transforming the corresponding point positions to the real space may be performed at a predetermined timing or performed each time the corresponding point is input. In addition, the information of the input corresponding point positions by using various images may be displayed on the display unit 190 at a predetermined timing (for example, in step S815), or the corresponding point positions input thus far may be displayed on the display unit 190 in a state in which the corresponding point positions are transformed to the positions in the image displayed on the display unit 190.

Modified Examples

According to the first exemplary embodiment to the fourth exemplary embodiment, the case has been described as an example where the deformation transformation between the images is represented by the TPS method or the FFD method, but the target is not limited to the above as long as the method is the deformation representation method in which the optimization of the deformation parameter can be performed by taking into account the regularization in the real space. For example, a radial basis function different from the TPS may be used. In addition, a large deformation diffeomorphic metric mapping (LDDMM) method of representing deformation transformation by an integral of a velocity field or the like may be used.

According to the first exemplary embodiment to the fourth exemplary embodiment, the example has been described in which the first transformed image and the second transformed image are obtained by applying the coordinate transformation to each of the first image and the second image, but the present invention is not limited to the above. For example, the coordinate transformation for making the shape of the object drawn in the first image close to the shape of the object drawn in the second image may be applied to obtain only the first transformed image. When the first transformed image and the shape of the object drawn in the second image are closer to each other, the identification of the corresponding points is facilitated. In this case, the corresponding point transformation unit 107 transforms the corresponding point position on the first transformed image among the information of the corresponding points included in each of the first transformed image and the second image to the position in the first image. Subsequently, the corresponding point transformation unit 107 outputs the corresponding point positions in the first image and the second image to the deformation transformation obtaining unit (deformation estimation unit) 108.

The function described according to the first exemplary embodiment to the fourth exemplary embodiment may be realized, for example, by a system constituted by a server apparatus (not illustrated) and a client apparatus (not illustrated). For example, the server apparatus (not illustrated) includes the deformation transformation obtaining unit (deformation estimation unit) 108 and the deformed image generation unit 109 illustrated in FIG. 1, and the client apparatus (not illustrated) includes the normalization transformation obtaining unit 103, the normalized image generation unit 104, the display control unit 105, the corresponding point obtaining unit 106, and the corresponding point transformation unit 107 and is connected to the operation unit 180 and the display unit 190. In this case, the client apparatus (not illustrated) applies the coordinate transformation to the image obtained from the data server 170 and obtains the corresponding point position in the space where the coordinate transformation has been performed to be transformed to the corresponding point position in the space in the original image. Subsequently, the client apparatus (not illustrated) outputs the plurality of images desired to be subjected to the registration and the corresponding point positions to the server apparatus (not illustrated). The server apparatus (not illustrated) obtains the deformation transformation on the basis of the plurality of images and the information of the corresponding point positions input from the client apparatus (not illustrated) and outputs the deformation transformation to the client apparatus (not illustrated). The client apparatus (not illustrated) generates the registered image on the basis of the deformation transformation input from the server apparatus (not illustrated) to be displayed on the display unit 190. The server apparatus (not illustrated) may further include the normalization transformation obtaining unit 103.

The present invention can also be realized by processing in which a program for realizing one or more of the functions according to the above-described exemplary embodiments is supplied to a system or an apparatus via a network or a storage medium, and one or more processors in a computer of the system or the apparatus reads out and executes the program. In addition, the present invention can also be realized by a circuit (for example, an application specific integrated circuit (ASIC)) that realizes one or more of the functions.

The image processing apparatus according to the above-described respective exemplary embodiments may be realized as a standalone apparatus or may adopt a mode in which a plurality of apparatuses are combined with each other so as to be mutually communicable to execute the above-described processing, and both of the configurations are included in the exemplary embodiments of the present invention. A common server apparatus or a server group may execute the above-described processing. It suffices when the plurality of apparatuses constituting the image processing apparatus and the image processing system can perform the communication at a predetermined communication rate, and also the plurality of apparatuses constituting does not necessarily need to exist in the same facility or the same country.

The exemplary embodiments of the present invention include a mode in which a program of software for realizing the functions of the above-described exemplary embodiments is supplied to the system or the apparatus, and the computer of the system or the apparatus reads out and executes a code of the supplied program.

Therefore, to realize the processing according to the exemplary embodiments in the computer, the program code itself installed into the computer is also one of the exemplary embodiments of the present invention. In addition, an operating system (OS) or the like running on the computer performs part or all of the actual processing on the basis of an instruction included in the program read by the computer, and the functions of the above-described exemplary embodiments may also be realized by the processing.

A mode in which the above-described exemplary embodiments are appropriately combined with each other is also included in the exemplary embodiments of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus comprising:
a memory storing a program; and
one or more processors which, by executing the program, function as:
a coordinate transformation obtaining unit configured to obtain information related to coordinate transformation for respectively transforming a first image and a second image obtained by imaging an object to a first transformed image and a second transformed image;
an information obtaining unit configured to obtain correspondence information that serves as information of a corresponding point included in each of the first transformed image and the second transformed image;
a transformation unit configured to transform a position of the corresponding point included in the first transformed image to a position in the first image and a position of the corresponding point included in the second transformed image to a position in the second image on the basis of the correspondence information obtained by the information obtaining unit and the coordinate transformation obtained by the coordinate transformation obtaining unit; and
a deformation transformation obtaining unit configured to obtain information related to deformation transformation for performing registration of the first image and the second image on the basis of information of the corresponding points respectively transformed to the positions in the first image and the second image by the transformation unit.

2. The image processing apparatus according to claim 1, wherein the deformation transformation obtaining unit obtains the information related to the deformation transformation on the basis of information of regularization for deformation of the object in the first image and the second image.

3. The image processing apparatus according to claim 1, further comprising:
a transformed image generation unit configured to respectively transform the first image and the second image to the first transformed image and the second transformed image on the basis of the information related to the coordinate transformation obtained by the coordinate transformation obtaining unit; and
a display control unit configured to display the first transformed image and the second transformed image on a display unit,
wherein the information obtaining unit obtains the correspondence information on the basis of an operation input by a user with respect to the first transformed image and the second transformed image displayed on the display unit.

4. The image processing apparatus according to claim 1, wherein the deformation transformation obtaining unit obtains the information related to the deformation transformation further on the basis of the information of the regularization for deformation of the object in the first transformed image and the second transformed image.

5. The image processing apparatus according to claim 1, wherein the first image and the second image are images obtained by imaging different shapes of the same object and are images in a real space.

6. The image processing apparatus according to claim 1, wherein the coordinate transformation obtaining unit obtains the information related to the coordinate transformation for transformation to the first transformed image and the second transformed image in which a shape of a body surface is deformed to a predetermined shape on the basis of the shape of the body surface of the object and a reference point on the body surface.

7. The image processing apparatus according to claim 1, wherein the coordinate transformation obtaining unit respectively obtains information related to nonlinear transformation to a normalized space from the space of the first image and the second image deformed such that a position and the shape of the body surface of the object are substantially matched in the first transformed image and the second transformed image as the information related to the coordinate transformation.

8. The image processing apparatus according to claim 1, wherein the deformation transformation obtaining unit obtains the information related to the deformation transformation for substantially matching the shape of the body surface of the object in each of the first image and the second image.

9. The image processing apparatus according to claim 1, wherein the deformation transformation obtaining unit obtains the information related to the deformation transformation on the basis of the information of the regularization for minimizing distortion accompanied by the deformation.

10. The image processing apparatus according to claim 1, further comprising an output unit configured to output data with which at least one of the first image, the second image, the first transformed image, the second transformed image, and a registered image based on the deformation transformation which is obtained by the deformation transformation obtaining unit can be displayed on an external apparatus.

11. The image processing apparatus according to claim 1, wherein the coordinate transformation obtaining unit obtains the information related to the coordinate transformation for transforming each of the first image and the second image to a space in which it is facilitated to obtain the corresponding point position.

12. The image processing apparatus according to claim 1, wherein the information obtaining unit obtains the information of the corresponding point further on the basis of the first image and the second image, and
wherein the deformation transformation obtaining unit obtains the information related to the deformation transformation on the basis of the information of the corresponding point obtained by the information obtaining unit on the basis of the first image and the second image and the information of the corresponding point in which the position of the corresponding point included in each of the first transformed image and the second transformed image is transformed to the position in the first image and the second image.

13. The image processing apparatus according to claim 1, wherein the coordinate transformation obtaining unit obtains information related to a plurality of different coordinate transformations for transforming the first image and the second image, and
wherein the information obtaining unit obtains the information of the corresponding point included in each of pairs of a plurality of different transformed images obtained by respectively applying the plurality of different coordinate transformations obtained by the coordinate transformation obtaining unit to the first image and the second image as the correspondence information.

14. The image processing apparatus according to claim 1, further comprising a storage unit configured to store the correspondence information obtained by the information obtaining unit while being associated with at least one of the first image and the second image.

15. An image processing apparatus comprising:
a memory storing a program; and
one or more processors which, by executing the program, function as:
a coordinate transformation obtaining unit configured to obtain coordinate transformation for respectively transforming a first image and a second image obtained by imaging an object to a first transformed image and a second transformed image;
an information obtaining unit configured to obtain correspondence information that serves as information of a corresponding point included in each of the first transformed image and the second transformed image;
a transformation unit configured to respectively transform a position of the corresponding point included in each of the first transformed image and the second transformed image to a position in the first image and the second image on the basis of the correspondence information obtained by the information obtaining unit and the coordinate transformation obtained by coordinate transformation obtaining unit; and
an output unit configured to output the positions of the corresponding points transformed to the positions in the first image and the second image by the transformation unit, the first image, and the second image to an apparatus configured to obtain deformation transformation for performing registration between the images.

16. The image processing apparatus according to claim 1, further comprising a deformed image generation unit configured to generate a first deformed image by deforming the first image on the basis of the deformation transformation obtained by the deformation transformation obtaining unit,
wherein the information obtaining unit obtains second correspondence information that serves as the information of the corresponding point included in each of the first deformed image and the second image, and
wherein the deformation transformation obtaining unit obtains information related to the deformation transformation for performing the registration of the first image and the second image on the basis of the second correspondence information.

17. An image processing apparatus comprising:
a memory storing a program; and
one or more processors which, by executing the program, function as:
a first information obtaining unit configured to obtain first correspondence information that serves as information of a corresponding point included in a first image and a second image obtained by imaging an object;
a deformation transformation obtaining unit configured to obtain information related to deformation transformation for performing registration of the first image and the second image on the basis of the first correspondence information;
a deformed image generation unit configured to generate a deformed image by deforming at least one of the first image and the second image on the basis of the information related to the deformation transformation; and
a second information obtaining unit configured to obtain second correspondence information that serves as information of the corresponding point included in each of the first image and the second image on the basis of the deformed image,
wherein the deformation transformation obtaining unit obtains the information related to the deformation transformation for performing the registration of the first image and the second image further on the basis of the second correspondence information.

18. The image processing apparatus according to claim 17, wherein the second information obtaining unit obtains third correspondence information that serves as information obtained by transforming the second correspondence information to a position of the corresponding point in the first image and the second image, and
wherein the deformation transformation obtaining unit obtains the information related to the deformation transformation on the basis of the third correspondence information.

19. The image processing apparatus according to claim 18, further comprising:
an inverse transformation unit configured to transform the position of the corresponding point in the first image obtained by transforming the second correspondence information by the second information obtaining unit to a position in a first deformed image on the basis of information related to first coordinate transformation; and
a display control unit configured to display the position in the first deformed image calculated by the inverse transformation unit on the first deformed image.

20. An image processing method for performing a process using one or more processors, the image processing method comprising:
obtaining coordinate transformation for respectively transforming a first image and a second image obtained by imaging an object to a first transformed image and a second transformed image;
obtaining correspondence information that serves as information of a corresponding point included in each of the first transformed image and the second transformed image;
transforming a position of the corresponding point included in the first transformed image to a position in the first image and transforming a position of the corresponding point included in the second transformed image to a position in the second image on the basis of the obtained correspondence information and the obtained coordinate transformation; and
obtaining deformation transformation for performing registration of the first image and the second image on the basis of information of the corresponding points respectively transformed to the positions in the first image and the second image.

21. A non-transitory computer-readable storage medium storing a program for causing a computer to execute the image processing method according to claim 20.

* * * * *